US008607057B2

(12) United States Patent
Nath

(10) Patent No.: US 8,607,057 B2
(45) Date of Patent: Dec. 10, 2013

(54) SECURE OUTSOURCED AGGREGATION WITH ONE-WAY CHAINS

(75) Inventor: Suman K. Nath, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 636 days.

(21) Appl. No.: 12/466,678

(22) Filed: May 15, 2009

(65) Prior Publication Data

US 2010/0290617 A1 Nov. 18, 2010

(51) Int. Cl.
*H04L 9/32* (2006.01)

(52) U.S. Cl.
USPC ............. 713/180; 375/296; 380/28; 370/389; 370/401; 370/409; 709/200; 709/238; 709/105; 713/168; 713/185; 381/71.4; 381/71.12; 381/71.9; 726/2; 726/4

(58) Field of Classification Search
USPC ......................................................... 713/180
See application file for complete search history.

(56) References Cited

U.S. PATENT DOCUMENTS

| 6,002,778 | A  | * | 12/1999 | Rossetti et al. ............... 381/71.4 |
|---|---|---|---|---|
| 6,370,247 | B1 | * | 4/2002 | Takaragi et al. ............... 380/28 |
| 6,477,534 | B1 | * | 11/2002 | Acharya et al. ............... 1/1 |
| 6,629,243 | B1 | * | 9/2003 | Kleinman et al. ............. 713/163 |
| 6,779,039 | B1 | * | 8/2004 | Bommareddy et al. ........ 709/238 |
| 6,859,831 | B1 |   | 2/2005 | Gelvin et al. |
| 6,873,258 | B2 |   | 3/2005 | Marples et al. |
| 7,068,350 | B2 | * | 6/2006 | Nishi et al. ..................... 355/53 |
| 7,212,634 | B2 | * | 5/2007 | Briscoe .......................... 380/203 |
| 7,404,080 | B2 | * | 7/2008 | Jakobsson ..................... 713/168 |
| 7,483,842 | B1 | * | 1/2009 | Fung et al. ..................... 705/7.14 |
| 8,024,574 | B2 | * | 9/2011 | Brokenshire et al. ......... 713/181 |
| 8,112,802 | B2 | * | 2/2012 | Hadjieleftheriou et al. .... 726/22 |
| 2001/0010046 | A1 | * | 7/2001 | Muyres et al. .................. 705/52 |
| 2002/0002678 | A1 | * | 1/2002 | Chow et al. .................... 713/169 |
| 2003/0120647 | A1 | * | 6/2003 | Aiken et al. ...................... 707/3 |
| 2003/0152292 | A1 |   | 8/2003 | Scott et al. |
| 2003/0204499 | A1 | * | 10/2003 | Shahabi et al. ................... 707/3 |

(Continued)

FOREIGN PATENT DOCUMENTS

WO    WO2008041052 A1    4/2008

OTHER PUBLICATIONS

Rodhe et al., "n-LDA: n-Layers Data Aggregation in Sensor Networks", 2008.*

(Continued)

*Primary Examiner* — Tamara T Kyle
*Assistant Examiner* — Ondrej Vostal
(74) *Attorney, Agent, or Firm* — Lee & Hayes, PLLC

(57) ABSTRACT

Secure outsourced aggregation of data using one-way chains is discussed in this application. Each input data source such as a sensor generates a Verifiable Synopsis ("VS") which includes sensor data, an Inflation Free Proof ("IFP") generated using a cryptographic function and a Self-Authenticating Value ("SEAL") chain generated using a one-way function. An aggregator takes a plurality VSs from multiple data sources and aggregates them together into one. Maximum value, top-k, count, count distinct, sum, average, and other aggregate functions may be used. Folded VS provides a concise proof that no value greater than the maximum value was reported by a sensor, thus providing a check against deflation of sensor data. Similarly, the cryptographic function of the IFP provides a mechanism to prevent inflation of the sensor data. Thus it becomes possible at a portal to verify that aggregated data has not been inflated or deflated by the aggregator.

18 Claims, 14 Drawing Sheets

(56) References Cited

U.S. PATENT DOCUMENTS

| | | | |
|---|---|---|---|
| 2004/0260683 A1* | 12/2004 | Chan et al. | 707/3 |
| 2005/0180573 A1* | 8/2005 | Pelly et al. | 380/277 |
| 2005/0182946 A1* | 8/2005 | Shatford | 713/185 |
| 2006/0215908 A1* | 9/2006 | Kamon et al. | 382/167 |
| 2007/0044139 A1* | 2/2007 | Tuyls et al. | 726/2 |
| 2007/0058871 A1* | 3/2007 | Deligiannakis et al. | 382/224 |
| 2007/0073170 A1* | 3/2007 | Danehorn et al. | 600/484 |
| 2007/0136794 A1* | 6/2007 | Chin et al. | 726/5 |
| 2007/0217543 A1* | 9/2007 | Hamada et al. | 375/296 |
| 2007/0282796 A1 | 12/2007 | Evenhaim | |
| 2008/0036617 A1 | 2/2008 | Arms et al. | |
| 2008/0042825 A1 | 2/2008 | Denny et al. | |
| 2008/0089311 A1* | 4/2008 | Roy et al. | 370/345 |
| 2008/0120275 A1* | 5/2008 | Cruanes et al. | 707/2 |
| 2008/0155656 A1* | 6/2008 | Agosta et al. | 726/3 |
| 2008/0211624 A1* | 9/2008 | Micali et al. | 340/5.6 |
| 2008/0263044 A1* | 10/2008 | Cantrill | 707/8 |
| 2009/0019530 A1* | 1/2009 | Keeler et al. | 726/4 |
| 2009/0043907 A1* | 2/2009 | Peterson et al. | 709/231 |
| 2009/0138521 A1* | 5/2009 | Buster | 707/200 |
| 2009/0172035 A1* | 7/2009 | Lessing et al. | 707/104.1 |
| 2009/0192980 A1* | 7/2009 | Beyer et al. | 707/2 |
| 2009/0198619 A1* | 8/2009 | Tripunitara et al. | 705/71 |
| 2009/0262925 A1* | 10/2009 | Vijayarangan | 380/29 |
| 2009/0273451 A1* | 11/2009 | Soppera et al. | 340/10.4 |
| 2010/0030738 A1* | 2/2010 | Geer | 707/3 |
| 2010/0031318 A1* | 2/2010 | Gardcia et al. | 726/3 |
| 2010/0049603 A1* | 2/2010 | Peterson et al. | 705/14.45 |
| 2010/0076818 A1* | 3/2010 | Peterson et al. | 705/10 |
| 2010/0132036 A1* | 5/2010 | Hadjieleftheriou et al. | 726/22 |
| 2010/0135494 A1* | 6/2010 | Armknecht et al. | 380/270 |
| 2010/0223214 A1* | 9/2010 | Kirpal et al. | 706/12 |

OTHER PUBLICATIONS

Liu et al., "Collusion-Resistant Multicast Key Distribution Based on Homomorphic One-Way Trees", 2011.*

Boneh et al., "A Survey of Two Signature Aggregation Techniques", 2003.*

Yacoub et al., "A Homomorphic Approach for Through-Wall Sensing", 2009.*

Bahi et al., "Secure Data Aggregation in Wireless Sensor Networks. Homomorphism versus Watermarking Approach", 2010.*

Onen et al., "Secure Data Aggregation with Multiple Encryption", 2007.*

Viejo et al., "Secure and scalable many-to-one symbol transmission for sensor networks", 2008.*

Ozdemir et al., "Secure data aggregation in wireless sensor networks: A comprehensive overview", 2009.*

Ma et al., "Forward-Secure Sequential Aggregate Authentication (Short Paper)", 2007.*

Saraogi, "Security in Wireless Sensor Networks".*

Przydatek et al., "SIA: Secure Information Aggregation in Sensor Networks", 2003.*

Perrig, "One-Way Chains", Aug. 2002.*

Chen et al., "Security and Deployment Issues in a Sensor Netowrk", 2000.*

Chan et al., "Secure Hierarchical In-Network Aggregation in Sensor Networks", 2006.*

Alon, et al., "The Space Complexity of Approximating the Frequency Moments", retrieved on Feb. 6, 2009 at <<http://www.cs.tau.ac.il/~nogaa/PDFS/amsz4.pdf>>, Feb. 22, 2002, pp. 1-19.

Bar-Yossef, et al., "Counting Distinct Elements in a Data Stream", retrieved on Feb. 6, 2009 at <<http://www.springerlink.com/content/8tbf7tk6dd1g94ul/fulltext.pdf>>, RANDOM 2002, LNCS 2483, pp. 1-10, 2002.

Bellar, et al., "Fast Batch Verification for Modular Exponentiation and Digital Signatures", retrieved on Feb. 6, 2009 at <<http://www.springerlink.com/content/5878856651p716n6/fulltext.pdf>>, pp. 236-250.

Chan, et al., "Secure Hierarchical In-Network Aggregation in Sensor Networks", retrieved on Feb. 6, 2009 at <<http://sparrow.ece.cmu.edu/group/pub/chan_perrig_song_hierarchicalAggregation.pdf>>, CCS 2006, Oct. 30-Nov. 3, 2006, Alexandria, VA., pp. 1-10.

Considine, et al., "Approximate Aggregation Techniques for Sensor Databases", retrieved on Feb. 6, 2009 at <<http://www.cs.unibo.it/~babaoglu/courses/cas/papers/pdf/13-sketches.pdf>>, Computer Science Dept., Boston University, 12 pages.

Cormode, et al., "An Improved Data Stream Summary: The Count-Min Sketch and it's Applications", retrieved on Feb. 6, 2009 at <<http://dimacs.rutgers.edu/~graham/pubs/papers/cm-full.pdf>>, Elsevier Science, Dec. 16, 2003, pp. 1-18.

Deshpande, et al., "Cache-and-Query for Wide Area Sensor Databases", retrieved on Feb. 6, 2009 at <<http://www.cs.umd.edu/~amol/papers/iris-sigmod.pdf>>, SIGMOD 2003, Jun. 9-12, 2003, San Diego, CA., 12 pages.

Dimitriou, et al., "Secure and Efficient In-Network Processing for Sensor Networks", retrieved on Feb. 6, 2009 at <<http://www.ait.gr/faculty/T_Dimitriou_files/secureAggregation.pdf>>, 8 pages.

Flajolet, et al., "Probabilistic Counting Algorithms for Data Base Applications", Journal of Computer and System Sciences, vol. 31, Issue 2, 1985, pp. 182-209.

Garofalakis, et al., "Proof Sketches: Verifiable In-Network Aggregation", retrieved on Feb. 6, 2009 at <<http://db.cs.berkeley.edu/papers/icde07-proofsketch.pdf>>, pp. 1-10.

Hu, et al., "Efficient Constructions for One-way Hash Chains", retrieved on Feb. 6, 2009 at <<http://www.informatics.indiana.edu/markus/papers/light4.pdf>>, pp. 1-20.

Kansal, et al., "SenseWeb: An Infrastructure for Shared Sensing", retrieved on Feb. 6, 2009 at <<http://ieeexplore.ieee.org/stamp/stamp.jsp?arnumber=4354151&isnumber=4354146>>, IEEE 2007, pp. 8-13.

Li, et al., "Dynamic Authenticated Index Structures for Outsourced Databases", retrieved on Feb. 6, 2009 at <<http://cs-people.bu.edu/lifeifei/papers/sigmod06-btree.pdf>>, SIGMOD 2006; Jun. 27-29, 2006, Chicago, IL., 12 pages.

Luk, et al., "Seven Cardinal Properties of Sensor Network Broadcast Authentication", retrieved on Feb. 6, 2009 at <<http://sparrow.ece.cmu.edu/group/pub/luk_perrig_whillock_propertiesBroadcast.pdf>>, SASN 2006, Oct. 30, 2006, Alexandria, Virginia, pp. 1-10.

Mykletun, et al., "Authentication and Integrity in Outsourced Databases", retrieved on Feb. 6, 2009 at <<http://delivery.acm.org/10.1145/1150000/1149977/p107-mykletun.pdf?key1=1149977&key2=8784714321&coll=GUIDE&dl=GUIDE&CFID=20999719&CFTOKEN=79409980>>, ACM Transactions on Storage, vol. 2, No. 2, May 2006, pp. 107-138.

Mykletun, et al., "Signature Bouquets: Immutability for Aggregated/Condensed Signatures", retrieved on Feb. 6, 2009 at <<http://www.ics.uci.edu/~gts/paps/esorics-2004.pdf>>, ESORICS 2004, LNCS 3193. pp. 160-176, 2004.

Narasimha, et al., "DSAC: Integrity for Outsourced Databases with Signature Aggregation and Chaining", retrieved on Feb. 6, 2009 at <<http://delivery.acm.org/10.1145/1100000/1099604/p235-narasimha.pdf?key1=1099604&key2=2305714321&coll=GUIDE&dl=GUIDE&CFID=21599502&CFTOKEN=89337848>>, CIKM 2005, Oct. 31-Nov. 5, 2005, Bremen, Germany, pp. 235-236.

Nath, et al., "Synopsis Diffusion for Robust Aggregation in Sensor Networks", retrieved on Feb. 6, 2009 at <<http://www.intel-iris.net/papers/N+04.pdf>>, SenSys 2004, Nov. 3-5, 2004, Baltimore, Maryland, USA, 13 pages.

Nuckolls, "Verified Query Results from Hybrid Authentication Trees", retrieved on Feb. 6, 2009 at <<http://www.springerlink.com/content/0n259x8h0k6rhk5q/fulltext.pdf>>, Data and Applications Security 2005, LNCS 3654, pp. 84-98, 2005.

Pang, et al., "Verifying Completeness of Relational Query Results in Data Publishing", retrieved on Feb. 6, 2009 at <<http://delivery.acm.org/10.1145/1070000/1066204/p407-pang.pdf?key1=1066204&key2=6535714321&coll=GUIDE&dl=GUIDE&CFID=21600078&CFTOKEN=17869081>>, SIGMOD 2005 Jun. 14-16, 2005, Baltimore, Maryland, USA, pp. 407-418.

Pang, et al., "Verifying Completeness of Relational Query Answers from Online Servers", retrieved on Feb. 6, 2009 at <<http://delivery.acm.org/10.1145/1340000/1330337/a5-pang.pdf?key1=1330337&key2=3445714321&coll=GUIDE&dl=GUIDE

(56) References Cited

OTHER PUBLICATIONS

&CFID=21000630&CFTOKEN=51834130>> ACM Transactions on Information and Systems Security, vol. 11, No. 2, Article 9, Pub. date: May 2008, 50 pages.

Przydatek, et al., "SIA: Secure Information Aggregation in Sensor Networks", retrieved on Feb. 6, 2009 at <<http://www.cs.berkeley.edu/~dawnsong/papers/sia.pdf>>, SenSys 2003, Nov. 5-7, 2003, Los Angeles, CA, 11 pages.

Sion, "Query Execution Assurance for Outsourced Databases", retrieved on Feb. 6, 2009 at <<http://www.vldb2005.org/program/paper/thu/p601-sion.pdf>>, Proceedings of the 31st VLDB Conference, Trondheim. Norway, 2005, pp. 601-612.

"Speed Comparison of Popular Crypto Algorithms", retrieved on Feb. 6, 2009 at <<http://www.cryptopp.com/benchmarks.html>>, Crypto++ 5.5 Benchmarks, 6 pages.

Vu, et al., "THIS: THreshold security for Information aggregation in Sensor networks", retrieved on Feb. 6, 2009 at <<http://ieeexplore.ieee.org/ielx5/4151644/4151645/04151665.pdf?isnumber=4151645>>, International Conference on Information Technology (ITNG 2007), 7 pages.

Wagner, "Resilient Aggregation in Sensor Networks", retrieved on Feb. 6, 2009 at <<http://www.cs.berkeley.edu/~daw/papers/resagg-sasn04.pdf>>, SASN 2004, Oct. 25, 2004, Washington, DC, USA, 10 pages.

Bouhraoua et al., "An Efficient Network-on-Chip Architecture Based on the Fat-Tree (FT) Topology", The Arabian Journal for Science and Engineering, vol. 32, No. 2C, Dec. 2007, pp. 13-26.

Daily et al., "Route Packets, Not Wires: On-Chip Interconnection Networks", DAC 2001, Las Vegas, Nevada, Jun. 18-22, 2001, 6 pages.

Gomez et al., "BPS: A Bufferless Switching Technique for NoCs", Dept. of Computer Engineering, Universidad Politecnica de Valencia, Valencia, Spain, Jan. 7, 2008, 6 pages.

Gravano et al., "Adaptive Deadlock-and Livelock-Free Routing With all Minimal Paths in Torus Networks", IEEE Transactions on Parallel and Distributed Systems, vol. 5, No. 12, Dec. 1994, pp. 1233-1251.

Greenberg et al., "Sharp Approximate Models of Deflection Routing in Mesh Networks", IEEE Transactions on Communications, vol. 41, No. 1, Jan. 1993, pp. 210-223.

Hoskote et al., "A 5-GHz Mesh Interconnect for a Teraflops Processor", IEEE Xplore, Sep.-Oct. 2007, pp. 51-61.

Katevenis et al., "Wormhole IP Over (Connectionless) ATM", ICS-FORTH, Crete, Greece, Jul. 1998, 25 pages, downloaded at http://archvlsi.ics.forth.gr/wormholeIP/arch98/wIP_98.html on Dec. 30, 2008.

Kumar et al., "A 4.6Tbits/s 3.6GHz Single-cycle NoC Router With a Novel Switch Allocator in 65nm CMOS", 2007 IEEE, p. 63-70.

Lemaire et al., "Performance Evaluation of a NoC-Based Design for MC-CDMA Telecommunications Using NS-2", Proceedings of the 16th International Workshop on Rapid System Prototyping (RSP'05), 2005 IEEE, 7 pages.

Linder et al., "An Adaptive and Fault Tolerant Wormhole Routing Strategy for k-ary n-cubes", IEEE Transactions on Computers, vol. 40, No. 1, Jan. 1991, pp. 2-12.

Lu et al., "Admitting and ejecting flits in wormhole-switched networks on chip", The Institution of Engineering and Technology (IET) Comput. Digit. Tech., vol. 1, No. 5, 2007, pp. 546-556.

Lu, Zhonghai, "Using Wormhole Switching for Networks on Chip: Feasibility Analysis and Microarchitecture Adaption", Thesis submitted to the Royal Institute of Technology, Kista, Sweden, May 2005, 70 pages.

Michelogiannakis, George, "Approaching Ideal NoC Latency with Pre-Configured Routes", Master's Thesis, Computer Science Department, School of Sciences and Engineering, University of Crete, Jun. 2007, 79 pages.

Peh et al., "A Delay Model and Speculative Architecture for Pipelined Routers", In Proceedings of the 7th International Symposium on High-Performance Computer Architecture, Jan. 22-24, 2001, Monterrey, Mexico, pp. 255-266.

Smith, Burton J., "Architecture and applications of the HEP multiprocessor computer system", Advances in Laser Scanning Technology, Proc. SPIE—Real-Time Signal Processing IV, vol. 298, Aug. 1981, pp. 241-248.

\* cited by examiner

SECURE OUTSOURCED AGGREGATION WITH ONE-WAY CHAINS

BACKGROUND

Every day the amount of data collected from a wide array of sources continues to grow. Sensors may acquire data ranging from temperature, air pressure, wave height, seismic activity, stock prices, commodity prices, and so forth. Where large numbers of sensors are employed, aggregators may receive and consolidate the data from sensors. These aggregators combine data, until a final parent aggregator generates a complete set of sensor data.

A portal, such as a server on the internet, may request information from an aggregator to fulfill a request. Unfortunately, it has traditionally been difficult to provide an assurance that information which has been aggregated has not been corrupted. Such corruption may occur because of system glitches or a malicious actor. Corruption may include increasing the reported value of a sensor ("inflation") or reducing the reported value ("deflation").

Various schemes have been put forth to try and secure aggregation. One scheme involves a single entity tightly controlling all aggregators, then making the assumption that these aggregators are not compromised. This scheme has several drawbacks. For example, an organization may not be able to afford the cost of maintaining such a system. Or the organization may not have the technical expertise or geographic reach necessary to maintain the aggregators.

Another scheme to secure aggregation involves the encryption of data at the sensor. This scheme has several drawbacks as well. For example, if the aggregator has the capability to decrypt data, typically considered necessary to aggregate the data, it gains the ability to tamper with the data before sending along to the portal. If the data is not decrypted at the aggregator, the portal is heavily loaded with the task of decrypting and aggregating data itself, removing the benefits of aggregators in the first place.

Thus, there is a desire to outsource aggregation while retaining the capability to determine if sensor data has been inflated or deflated.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Secure aggregation may be accomplished through the use of a framework incorporating inflation free proofs and a deflation free proofs for sensor data. This framework and associated protocols permits use of aggregates such as max, top-k, sum, average, count, count distinct, etc., in such a fashion as to provide an assurance that an outsourced aggregator has not tampered with the results.

A sensor or other input data source generates a Verifiable Synopsis ("VS") which includes sensor data, an Inflation Free Proof ("IFP") generated using a cryptographic function and a Self-Authenticating Value ("SEAL") chain generated using a one-way function from a seed value. An aggregator may take a plurality of SEALs and fold them together, creating a SEAL representing the true aggregate result (e.g., the maximum value for the MAX aggregate). This folded value provides a concise proof of the aggregate value reported by a sensor, thus providing a check against deflation of sensor data. Similarly, the cryptographic function of the IFP provides a mechanism to prevent inflation of the sensor data. The aggregator may then create Aggregated Verifiable Synopses ("AVS") which includes the folded SEAL, the IFP's and the sensor data.

In this application, the maximum function is used as an example aggregate function, and not by way of limitation. Many other aggregates such as Count, Sum, Average, Random Samples (and hence any answer based on samples) can be computed using Maximum as a black box; therefore, our solution for Maximum aggregate can be applied to all these aggregates as well.

A portal may take the AVS and generate a reference synopsis (RS) which is compared to the VS. When the RS equals the VS, the sensor data is valid.

SEAL chains of equal length may be folded together while retaining the deflation-free proof. In simple rolling, all SEAL chains are rolled forward (that is, iterated with the one-way function F( )) to the same length, then folded together. However, significant reductions in computational load are realized by folded rolling. Folded rolling involves ordering SEAL chains by length, rolling a shortest first SEAL chain forward to match a length of a next shortest second SEAL chain. The first SEAL chain and second SEAL chain are then folded together. The resulting folded SEAL is then folded with the next shortest SEAL chain. The process is repeated until only a single SEAL remains. Folded rolling results in significant reductions in computational overhead, allowing computationally intensive one-way functions F( ), such as RSA, to exceed the performance of simpler hash functions.

Finally, in addition to the maximum function described, other functions may benefit from this secure framework. For example, a top-k function may securely aggregate a top "k" number of values, where k is an integer number. From a set of SEAL values, a maximum SEAL value is determined. The maximum SEAL value is stored and removed from the set, and the set is refolded and a next maximum SEAL value is determined. This process continues, removing the top value until k is reached.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
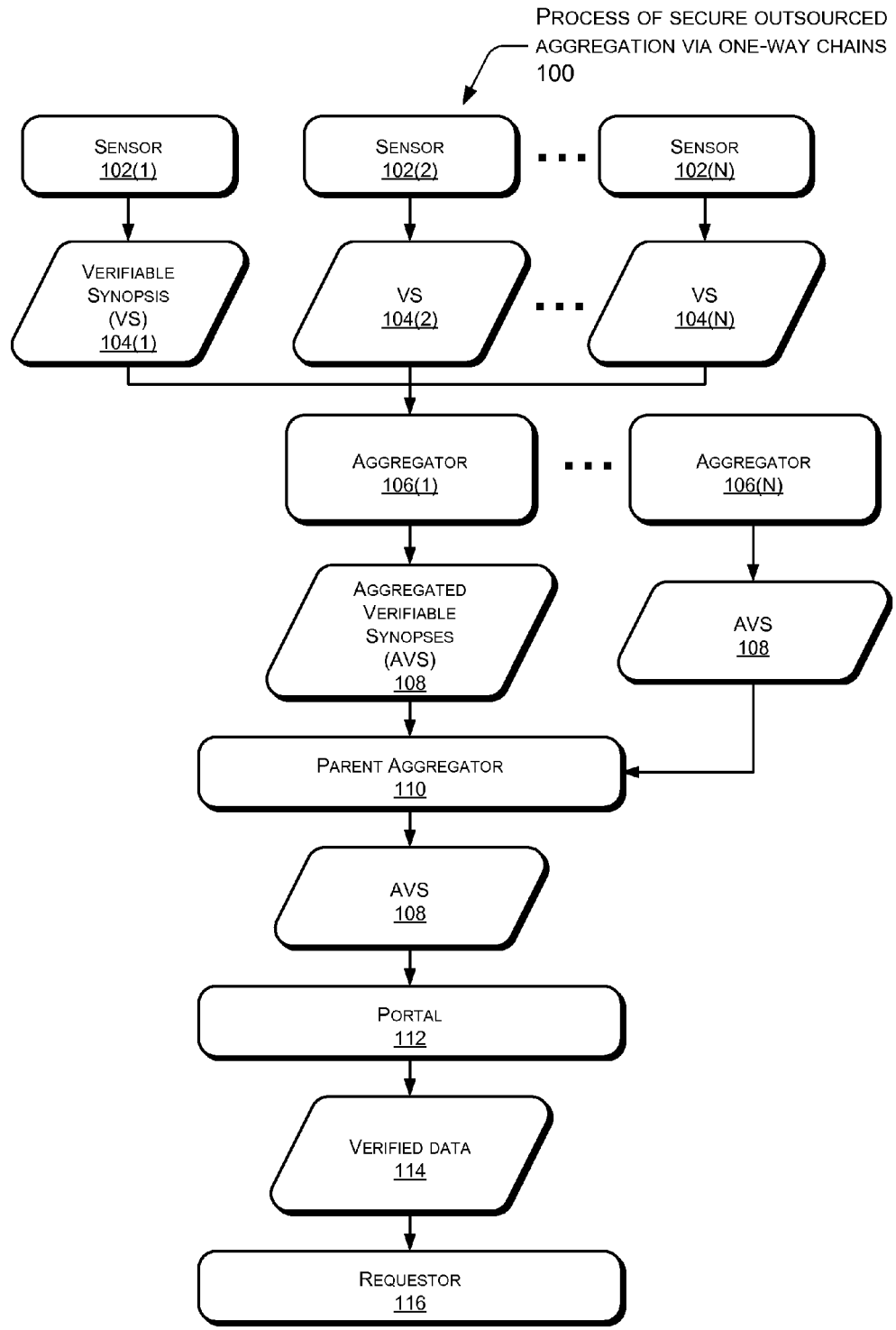
FIG. 1 is a flow diagram of an illustrative process of secure outsourced aggregation via one-way chains.

As described above, secure aggregation of data may be provided by using one-way chains. Unlike prior solutions, an inflation free proof and a deflation free proof using a SEAL are provided, which constrains the opportunity for an aggregator to corrupt data. Thus, aggregation may be outsourced with the reasonable assurance that aggregator has not corrupted the sensor data. In this application, aggregation functions discussed are max and top-k, however other aggregation functions are also possible.

A sensor generates a Verifiable Synopsis ("VS") which includes sensor data, an Inflation Free Proof ("IFP") generated using a cryptographic function such as a message authentication code ("MAC") and a Self-Authenticating Value ("SEAL") chain generated using a homomorphic one-way function, such as the RSA algorithm developed by Ron Rivest, Adi Shamir, and Leonard Adleman at the Massachusetts Institute of Technology.

An aggregator may take a plurality of these SEALs which have been generated using a homomorphic function and "fold" them together using modulo multiplication to create a SEAL for a maximum value (for the Maximum aggregate function). The fold operation is denoted in this application with the symbol "⊙". This folded value provides a concise proof that no value greater than the maximum value was reported by a sensor, thus providing a check against deflation of sensor data. Similarly, the MAC or other cryptographic function of the IFP provides a mechanism to prevent inflation of the sensor data. The aggregator may then create Aggregated Verifiable Synopses ("AVS") which includes the folded SEAL, the IFP's and the sensor data. Because the aggregator lacks the cryptographic capability to generate a MAC or SEAL, it is unable to corrupt data.

A portal may take the AVS and generate a reference synopsis (RS) which is compared to the VS. This RS may be generated by a process similar to that used on the sensor and aggregator, such as computing an IFP and folding SEALs together. When the generated RS equals the VS, the sensor data is valid.

The folding described above is facilitated when SEAL chains are of equal length before folding. In simple rolling, all SEAL chains are rolled forward to the same length, then folded. While straightforward, simple rolling may be computationally inefficient. Forward rolling may be reduced by using folded rolling. Folded rolling orders SEAL chains by length and folds together SEAL chains of equal length. When SEAL chains are of unequal length, a shortest first SEAL chain is rolled forward to match a length of a next shortest second SEAL chain. The first SEAL chain and second SEAL chain, now of equal length, are then folded together. The resulting folded SEAL is then folded with the next shortest SEAL chain. The process may be repeated until only a single SEAL remains.

Previous techniques (e.g., the Count algorithm by Flajolet and Martin, the Count algorithm by Alon, Matias, and Szegedy) have shown how to compute approximate answer of Count/Sum/Average queries using Maximum queries. The processes presented in this application may be applied to these aggregates as well.

Finally, our scheme also supports returning a top-k number of values, where k is an integer number. In this process, the aggregate returns k folded SEALs. The first SEAL is generated by folding all SEALs in the system, the second folded SEAL is computed by folding all but the maximum SEAL in the system, the third folded SEAL is computed by folding all but the two maximum SEALs in the system, and so on. A Top-K query can be used to answer a random sample query as well, where every value may be tagged with a uniformly random number, and a top-k query can be answered over the tags only; thus providing a uniformly random sample of the values.

Secure Outsourced Aggregation Via One-Way Chains

FIG. 1 is a flow diagram of an illustrative process 100 of secure outsourced aggregation via one-way chains. Input data sources 102(1) ... (N) are referred to for convenience and not as a limitation as "sensors." A sensor 102 may be a physical device providing data, a set of instructions configured to execute on a processor, software module stored in memory, etc. Each sensor is configured to generate a verifiable synopsis ("VS") 104. For example, sensor 102(1) generates VS 104(1), sensor 102(2) generates VS 104(2), and so forth through sensor 102(N) generating VS 104(N).

An aggregator 106 may be configured to combine and consolidate VSs 104 from many sensors 102 into an Aggregated Verifiable Synopsis ("AVS") 108. In one implementation, aggregator 106 is a computer server comprising a processor coupled to a memory and communication interface. As illustrated, aggregator 106(1) accepts VSs 104(1) ... (N) from sensors 102(1) ... (N). Similarly, aggregator 106(N) may accept VSs from other sensors, which for clarity are not illustrated here. In another implementation, sensors 102 may provide data to a proxy or other sub-aggregation device, which in turn would provide a VS of that data to aggregator 106.

While a single aggregator may be sufficient, in larger sensor networks a hierarchy of aggregators may be desirable for speed, load distribution, or other purposes. In this case, each aggregator 106 may provide an AVS 108 to a parent aggregator 110. Parent aggregator 110 may then in turn provide an AVS 108 to portal 112.

In one implementation, portal 112 is a computer server comprising a processor coupled to a memory and communication interface. Portal 112 may evaluate the AVS, verify the data, and produce verified data 114 to a requestor 116. Requestor 116 may be an individual, computing device, set of instruction executing on a processor, etc.

Figure 2:
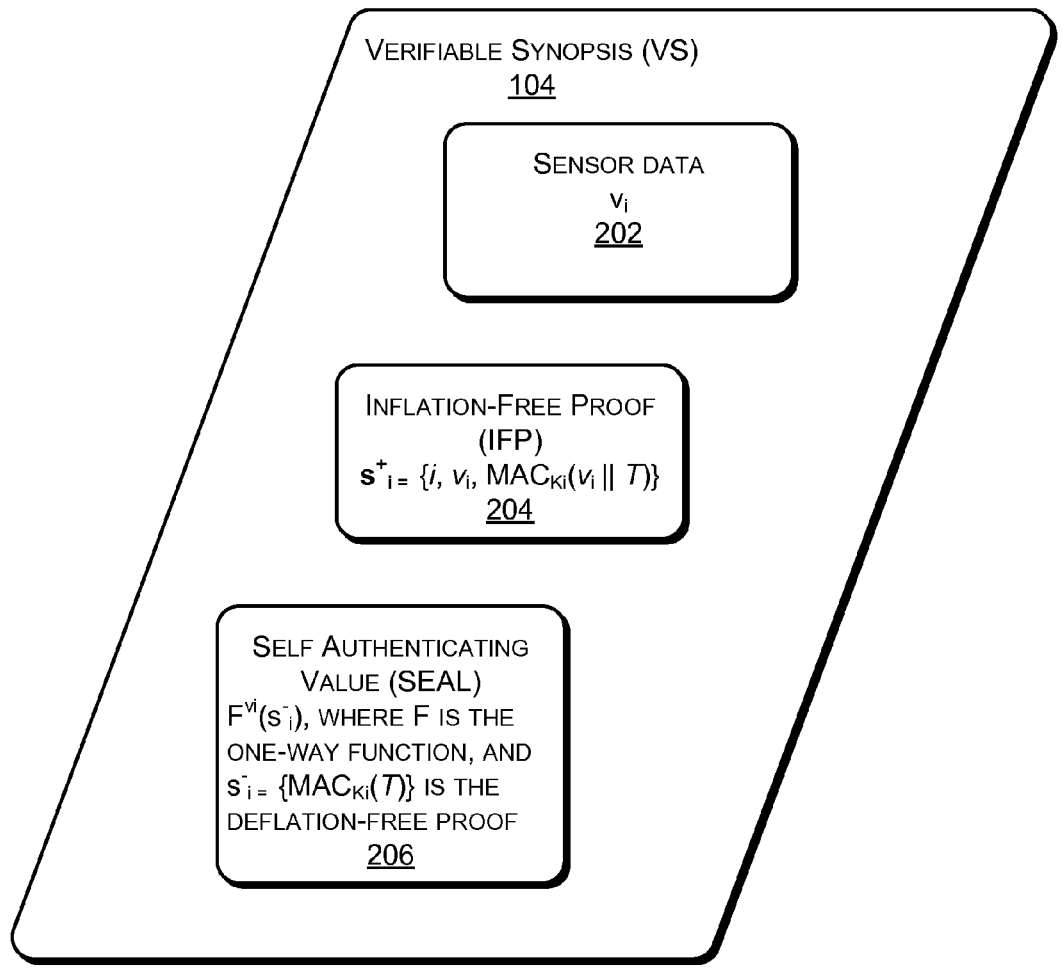
FIG. 2 is a schematic diagram of an illustrative verifiable synopsis generated by a sensor.

FIG. 2 is a schematic diagram 200 of an illustrative VS 104 generated by a sensor 102. A VS may comprise sensor data 202, an inflation-free proof ("IFP") 204, and a self-authenticating value (SEAL) 206. The presence of an IFP 204 and SEAL 206 in the VS results from a decomposition of security requirements into two parts: preventing inflation and preventing deflation. The security requirement of preventing inflation is met by the IFP, while the requirement to prevent deflation is addressed by the DFP, as described later.

At 202, the sensor data $v_i$ comprises the value being reported by sensor i. In one embodiment, $v_i$ may be reported as an integer. Several methods for representing non-integer values as integers are available and may be used.

At 204, the IFP $s_i^+$ may comprise identification of the sensor i, sensor data $v_i$, and a message authentication code ("MAC"). A MAC algorithm may be configured to accept as input a secret symmetric key and an arbitrary-length message, and output a MAC. The MAC value protects both a message's data integrity as well as its authenticity, by allowing a verifier with the secret symmetric key to detect changes in the message content.

In one implementation, the MAC secret symmetric key may be a key associated with that particular sensor $K_i$ and shared with portal 112. The MAC may use as parameters $v_i$ and time T which may be concatenated, as indicated by the "||" symbol in the following expression: $s^+_i = \{i, v_i, MAC_{Ki}(v_i\|T)\}$. Time T may comprise a time value, such as that relative to a given epoch. The MAC may utilize a full domain hash. This provides an inflation free proof, as the MAC key is available to the sensor 102 and the portal 112, not aggregator 106. Thus, inflation of $v_i$ at the aggregator would be discovered by portal 112.

While the IFP 204 prevents inflating a reported value, it has traditionally been difficult to prove that deflation has not taken place. Stated another way, it is useful to verify that an aggregator 106 has not thrown away a true maximum value $v_m$. Constructing one-way chains of self-authenticating values (SEALs) using a deflation-free proof ("DFP") 206 prevents this. The DFP $s_i^-$ comprises a MAC using $K_i$ and a parameter of time T, as shown in this expression: $s^-_i = \{MAC_{Ki}(T)\}$. An illustrative one-way chain of SEALs built using the DFP as a seed is described next.

Figure 3:
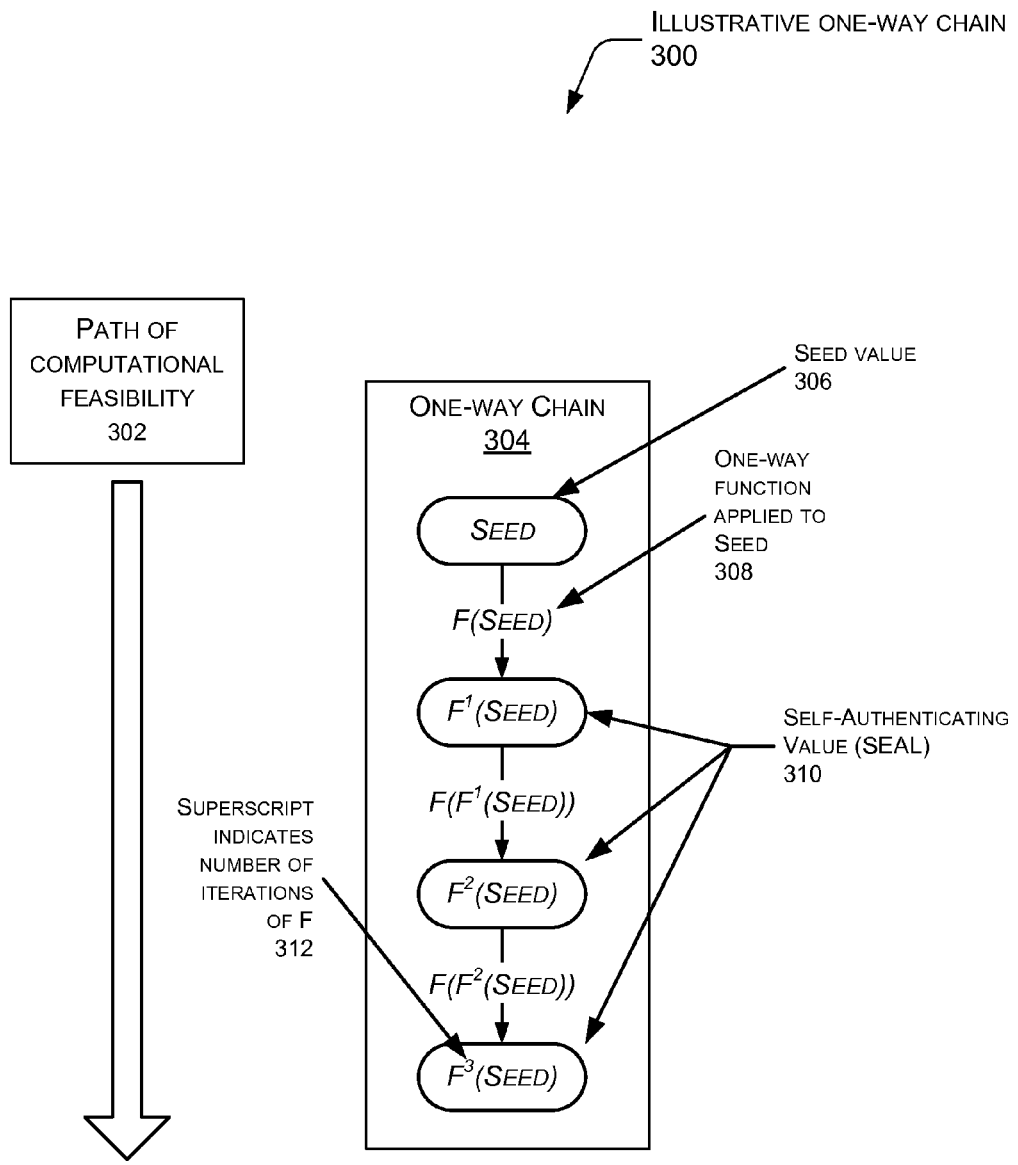
FIG. 3 is a schematic diagram of an illustrative one-way chain.

FIG. 3 is a schematic diagram of an illustrative one-way chain 300. Arrow 302 indicates a path of computational feasibility directed along one-way chain 304, also known as a "hash chain." This represents the mathematical nature of a one-way chain in that the function is considered computationally infeasible to inverting. Stated another way, a one-way function is computationally "easy" when applying the function, but is computationally "difficult" to undo. A seed value 306 is indicated. In one embodiment, the seed value 306 comprises DFP $s_i^-$. A one-way function F( ) may be applied 308 to the seed 306, resulting in a SEAL. As used in this application, the superscript for the function indicates the number of iterations 312 performed by function F. For example, $F^3$(Seed) indicates that the one-way function F( ) has been applied to the seed in three iterations, and is thus equivalent to F(F(F(Seed))).

One-way function F( ) may comprise an algorithm such as Message-Digest algorithm 5 ("MD5"), the RSA algorithm described by Ron Rivest, Adi Shamir, and Leonard Adleman ("RSA"), and the like. As described later, there are further advantages to using the RSA or other homomorphic one-way functions, such as facilitating folded rolling.

Figure 4:
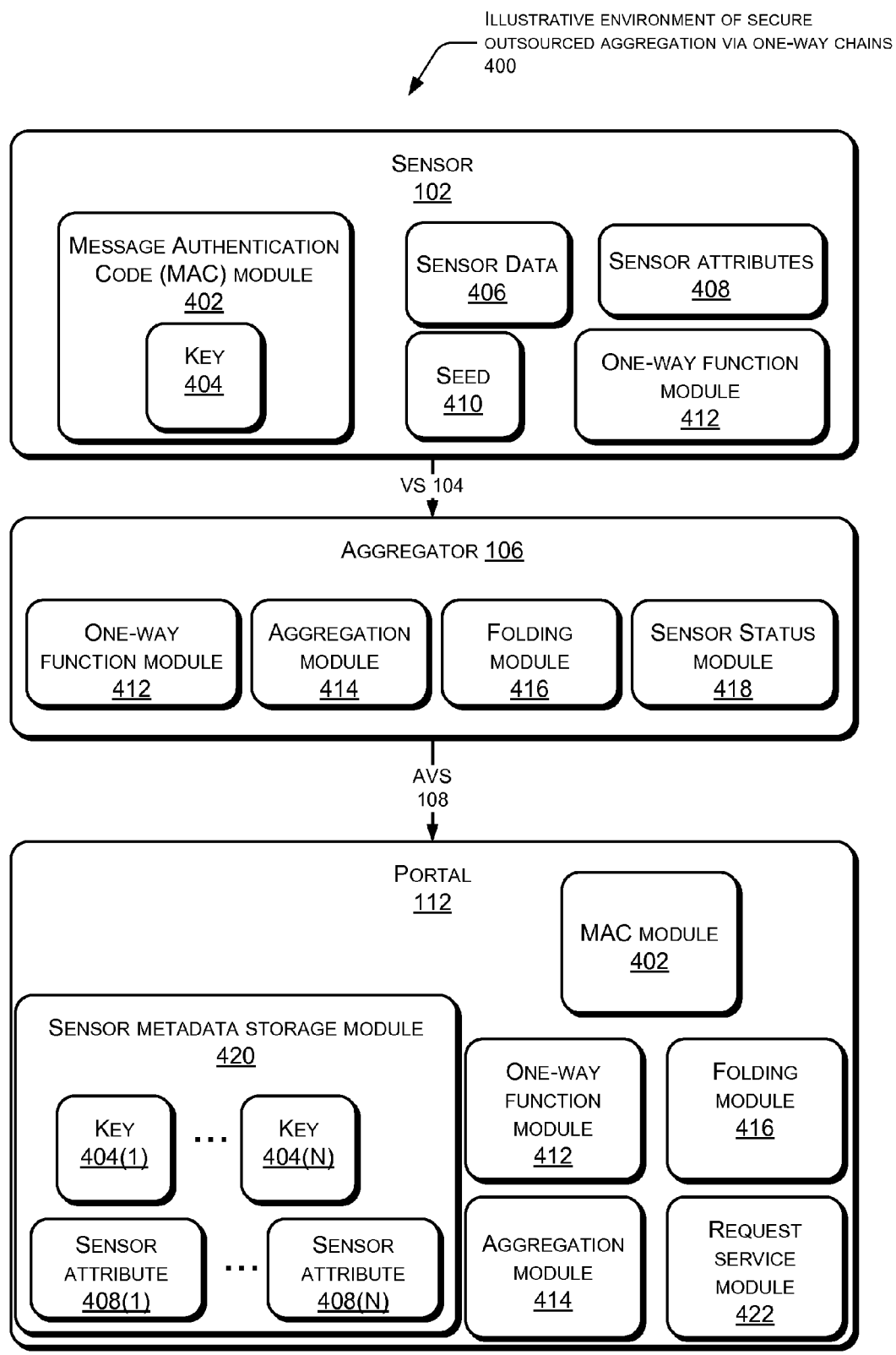
FIG. 4 is a schematic diagram of an illustrative environment of secure outsourced aggregation via one-way chains.

FIG. 4 is a schematic diagram of an illustrative environment 400 of secure outsourced aggregation via one-way chains. Sensor 102, aggregator 106, and portal 112 may each comprise a processor, memory, and communications interface, which are not shown for clarity. Where appropriate, the following elements, data, or instructions for execution are stored in the memory.

In one embodiment, sensor 102 may comprise the following: A MAC module 402, configured to generate the MAC as described above with respect to FIG. 2. MAC module 402 may include a key 404, which in one implementation, comprises a secret shared between the sensor 102 and portal 112, but unavailable to the aggregator(s) 106.

Sensor data 406 may comprise data resulting from measurements or other inputs received by sensor 102 and stored in sensor 102's memory. Sensor attributes 408 may be stored in sensor 102's memory and may include an identifier for the particular sensor, information about the instrumentation of the sensor, sensor status, and so forth. A seed 410 may be stored in sensor 102's memory for use in a SEAL. On one implementation, this seed may be generated as described above with respect to FIG. 2 is illustrated. Sensor 102 may also comprise a one-way function module 412, which incorporates the one-way function F( ) as described above with respect to FIG. 3.

Aggregator 106 may comprise a one-way function module 412, a aggregation module 414, and a folding module 416. Aggregation module 414 determines the maximum value $v_m$ of values $v_i$ received from sensor 102. Folding module 416 may roll SEAL chains forward and fold together. Folding may comprise an XOR function where the one-way function F( ) comprises MD5, or a modulo multiplication where the one-way function F( ) comprises RSA. Because one purpose of the SEALs is to prevent deflation by an aggregator, the aggregator can fold, but not create, SEALS. The generation of SEALs and folding for a secure max is described below with respect to FIG. 5. Aggregator 106 may also comprise a sensor status module 418, which maintains a list of sensors which are out of service. For clarity, this diagram omits the parent aggregator 110 shown in FIG. 1, however parent aggregator 110 may include the same elements as aggregator 106.

Portal 112 may comprise a sensor metadata storage module 420, a MAC module 402, a one-way function module 412, an aggregation module 414, a folding module 416, and a request service module 422. Sensor metadata storage module 420 may comprise sensor keys 404, sensor attributes 408, sensor status, and so forth. For example, sensor status may include whether a sensor is unavailable or offline. Sensors indicated as being offline may be probed by the portal to verify status, again providing a process of confirming the aggregator is truthfully reporting failures. Request service module 422 may be configured to provide verified data to requestor 116. Note that portal 112 includes modules found at both the sensor 102 and aggregator 106. As described below in more depth below, this is because the portal produces reference synopses ("RS") to compare with the VS.

Generating SEALS and a Secure Maximum

Figure 5:
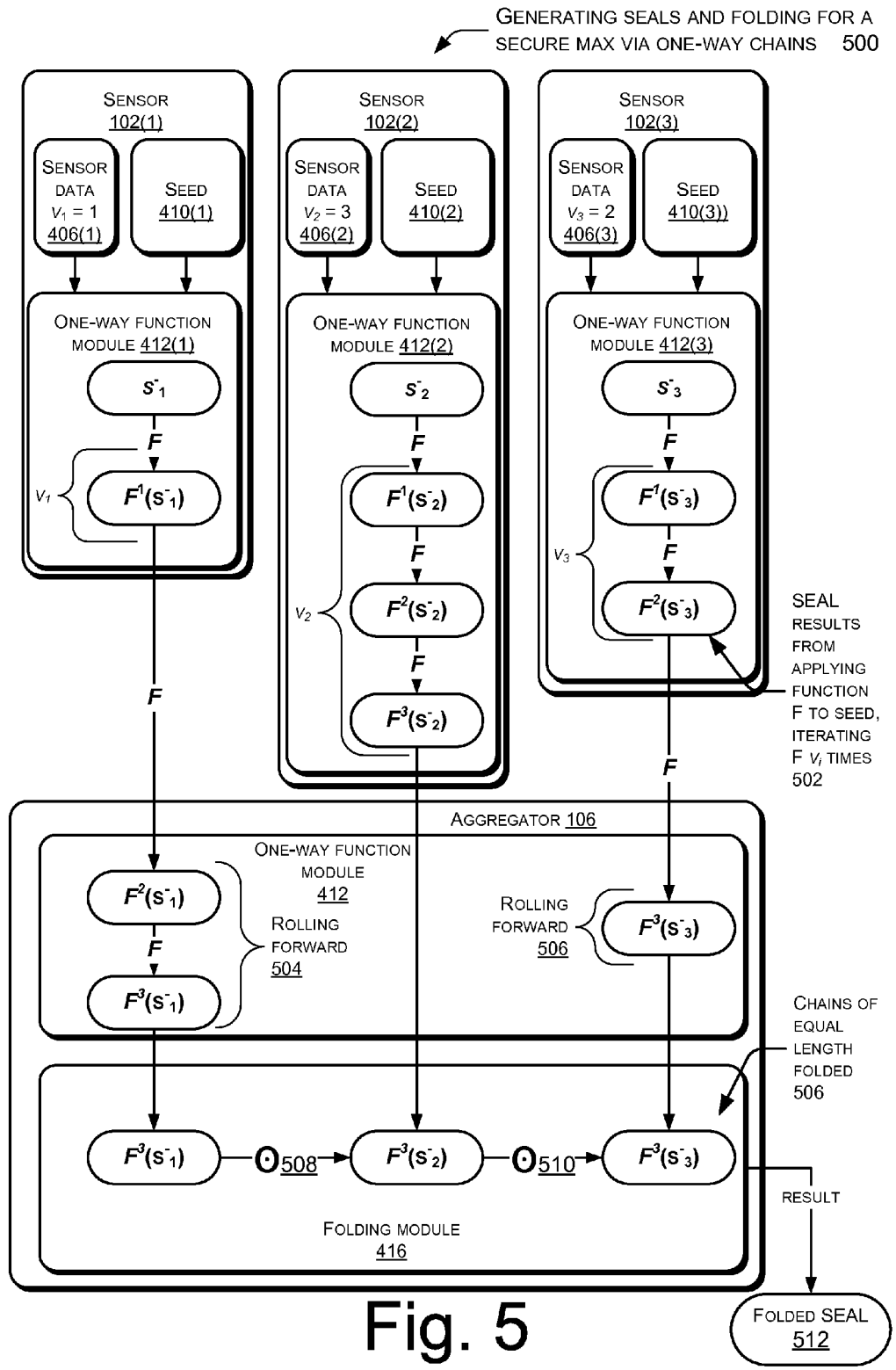
FIG. 5 is a schematic diagram illustrating generation and folding of self-authenticating values (SEALs) for a secure maximum via one-way chains.

FIG. 5 is a schematic diagram 500 illustrating generation and folding of self-authenticating values (SEALs) for a secure maximum via one-way chains. Three sensors are illustrated as listed in the following table:

TABLE 1

| Sensor | Sensor Data | Seed | SEAL at Sensor |
|---|---|---|---|
| 102(1) | $v_1 = 1$ | $s_1^-$ | $F^1(s_1^-)$ |
| 102(2) | $v_2 = 3$ | $s_2^-$ | $F^3(s_2^-)$ |
| 102(3) | $v_3 = 2$ | $s_3^-$ | $F^2(s_3^-)$ |

Recall that applying one-way function F( ) $v_i$ times to a seed generates a SEAL. Sensor 102(1) reports sensor data value $v_1=1$, and so one-way function module 412(1) applies one-way function F( ) once against the seed $s_1^-$, resulting in $F^1(s_1^-)$. Similarly, sensor 102(2) reports sensor data value $v_2=3$, and iterates its seed $s_2^-$ three times, resulting in $F^3(s_2^-)$. Likewise, sensor 102(3) reports sensor data value $v_3=2$ and iterates its seed twice, resulting in $F^2(s_3^-)$. A SEAL results from applying one-way function F( ) to a seed, and iterating F( ) $v_i$ times as shown at 502.

Folding of one-way chains is facilitated when the one-way chains are of equal length. In the illustration of FIG. 5, the longest SEAL chain is that of sensor 102(2), with a length of 3, representing value $v_2=3$. The two shorter SEAL chains of sensor 102(1) and 102(3) are rolled forward at aggregator 106 to be equal in length with the SEAL chain of 102(2). Thus, at

504 $F^1(s_1^-)$ from sensor 102(1) is rolled forward twice to produce $F^3(s_1^-)$. Similarly, at 506 $F^2(s_3^-)$ from sensor 102(3) is rolled forward once to produce $F^3(s_3^-)$.

Now of equal length, the SEAL chains $F^3(s_1^-)$, $F^3(s_2^-)$, and $F^3(s_3^-)$ may be folded as shown at 506. At 508, $F^3(s_1^-)$ and $F^3(s_2^-)$ are folded. The results of this first fold are then folded at 510 with $F^3(s_3^-)$, resulting in a folded SEAL 512.

Note that folding does not require knowledge of the secret key $K_i$. Additionally, the folded SEAL has the same size as an individual SEAL and it can be used to verify all SEALs together. Folded SEALs are also secure, in that an adversary cannot produce a folded SEAL without knowing all the individual SEALs. Thus, the SEAL provides a deflation-free proof for reported sensor data.

Figure 6:
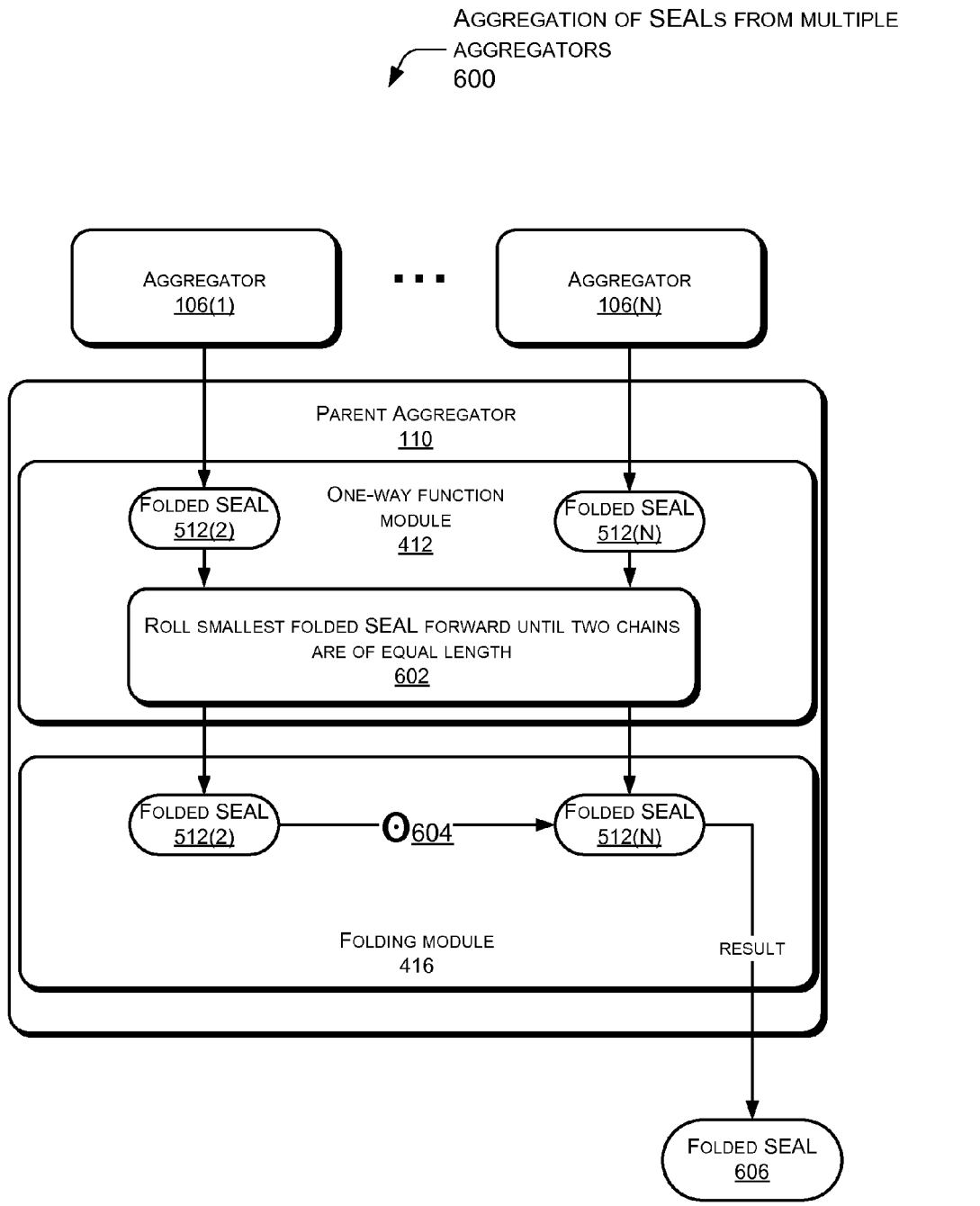
FIG. 6 is a schematic diagram illustrating aggregation of SEALS from multiple aggregators.

FIG. 6 is a schematic diagram 600 illustrating aggregation of SEALs from multiple aggregators. As described above with respect to FIG. 1, folded SEALs may be received from several aggregators at one parent aggregator 110. In this way, a hierarchy of aggregators may be implemented for load balancing, speed, and so forth. As illustrated, aggregators 106(1) ... 106(N) provide folded seals 512(2) ... 512(N) to parent aggregator 110. The smallest folded SEALs are rolled forward at 602 until the two chains are of equal length using a one-way function module 412. Once the length of the SEAL chains are the same, they may be folded together at 604 using a folding module 416. Once folding is complete, a single folded SEAL 606 results.

The homomorphic nature of the one-way function is leveraged in this scenario of multiple aggregators. This is because, in one implementation, such hierarchical aggregation requires that one-way chains be rolled forward even after they have been previously folded. A suitable one-way function F is homomorphic with respect to the folding ⊙ both in domain and range. In other words, $F(x_1 ⊙ x_2)) = F(x_1) ⊙ F(x_2)$, where $x_1$ and $x_2$ are inputs to F. One suitable one-way function F( ) is RSA, which is homomorphic with respect to the folding operator modulo multiplication. RSA encryption is performed by exponentiating the plaintext by e, modulo some large composite number m which is the product of two large primes. Hence, $E(x_1 \cdot x_2) = (x_1 \cdot x_2)^e \mod m = (x_1^e \mod m) \cdot (x_2^e \mod m) = E(x_1) \cdot E(x_2)$. Therefore, RSA encryption may be used as F( ) and module m multiplication as the folding function ⊙. The hardness of the RSA decryption suffices to provide one-wayness for F( ), and as long as it is insured that seeds are relatively prime to m (e.g., no 0 seeds), folding with multiplication modulo m preserves randomness.

Generating VS, AVS, and Evaluating

Figure 7:
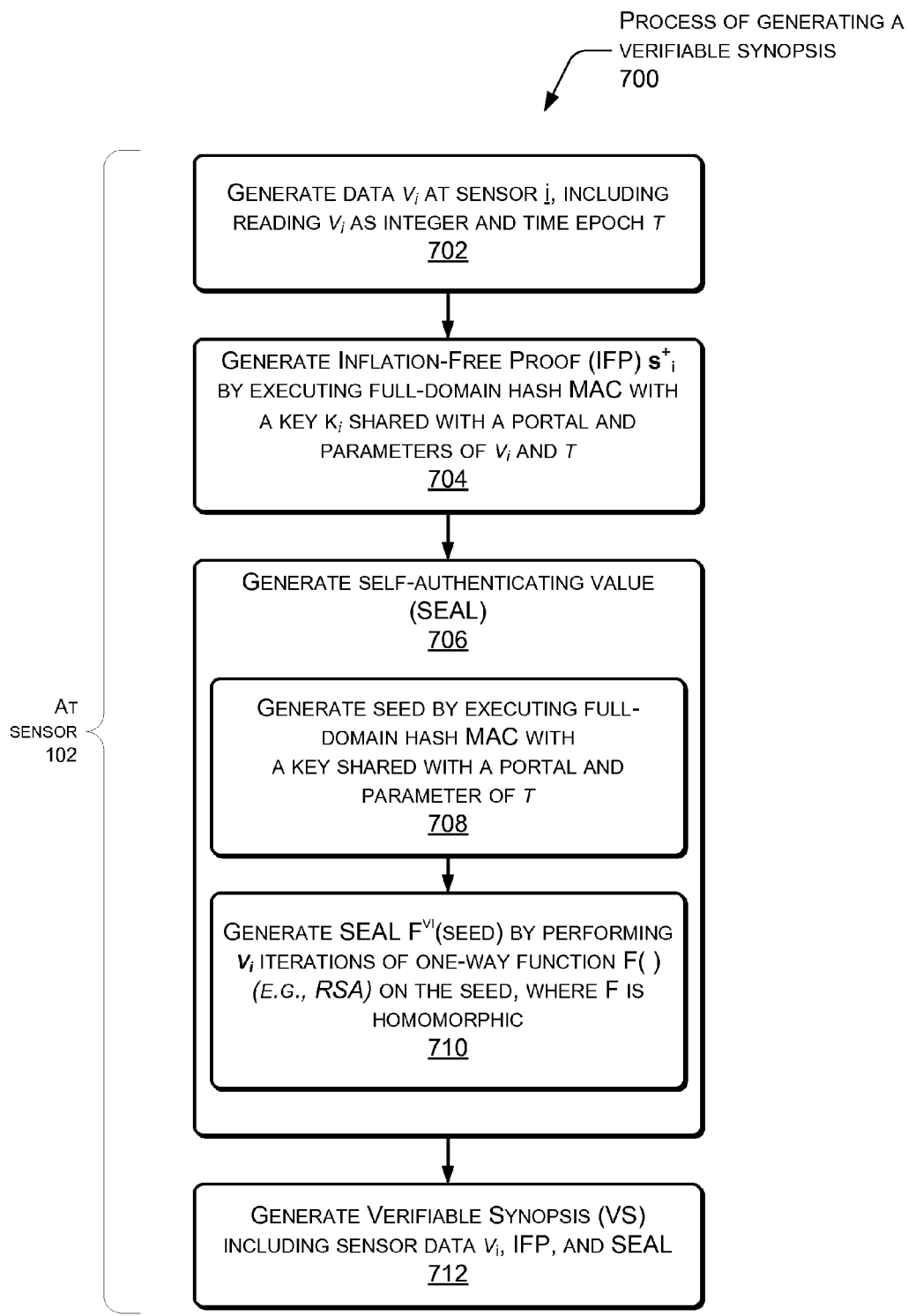
FIG. 7 is a flow diagram of an illustrative process of generating a verifiable synopsis ("VS").

FIG. 7 is a flow diagram of an illustrative process of generating a verifiable synopsis ("VS") that may, but need not, be implemented using the architectures shown in FIGS. 1-6. The process 700 will be described in the context of the architecture of FIGS. 1-6 for convenience and clarity. In some variations, the process 700 may be used to implement the secure outsourced aggregation shown and described with reference to FIG. 1. In one implementation, the following process may take place at a sensor.

At 702, sensor i generates data of value $v_i$ and time epoch T. As described above, in some implementations $v_i$ may be expressed as an integer value. In some implementations, T may also be expressed as an integer value.

At 704, an IFP is generated as discussed in FIG. 2 above. IFP $s_i^+$ results from executing a full domain hash MAC with key $K_i$ with parameters of $v_i$ and T. This full domain hash is the RSA based signature scheme which involves hashing a message using a function whose image size equals the size of the RSA modulus, and then raising the result to the secret RSA exponent. This provides an inflation free proof, as the MAC key $K_i$ is available to the sensor and the portal, but not aggregator. Thus, inflation of $v_i$ at the aggregator would be discovered by portal.

At 706, a SEAL is generated. At 708, a seed is generated by executing the full domain hash MAC with key $K_i$ and using parameter T. At 710, the SEAL is generated by performing iterations of one-way function F( ) on the seed. The number of iterations of function F( ) corresponds to the integer value of $v_i$. As described in more depth below with respect to folding, use of a homomorphic function, such as RSA, permits folding of multiple SEALs using modulo multiplication.

At 712, a verifiable synopsis ("VS") including sensor data $v_i$, IFP, and SEAL is generated. This VS may then be provided to an aggregator.

Figure 8:
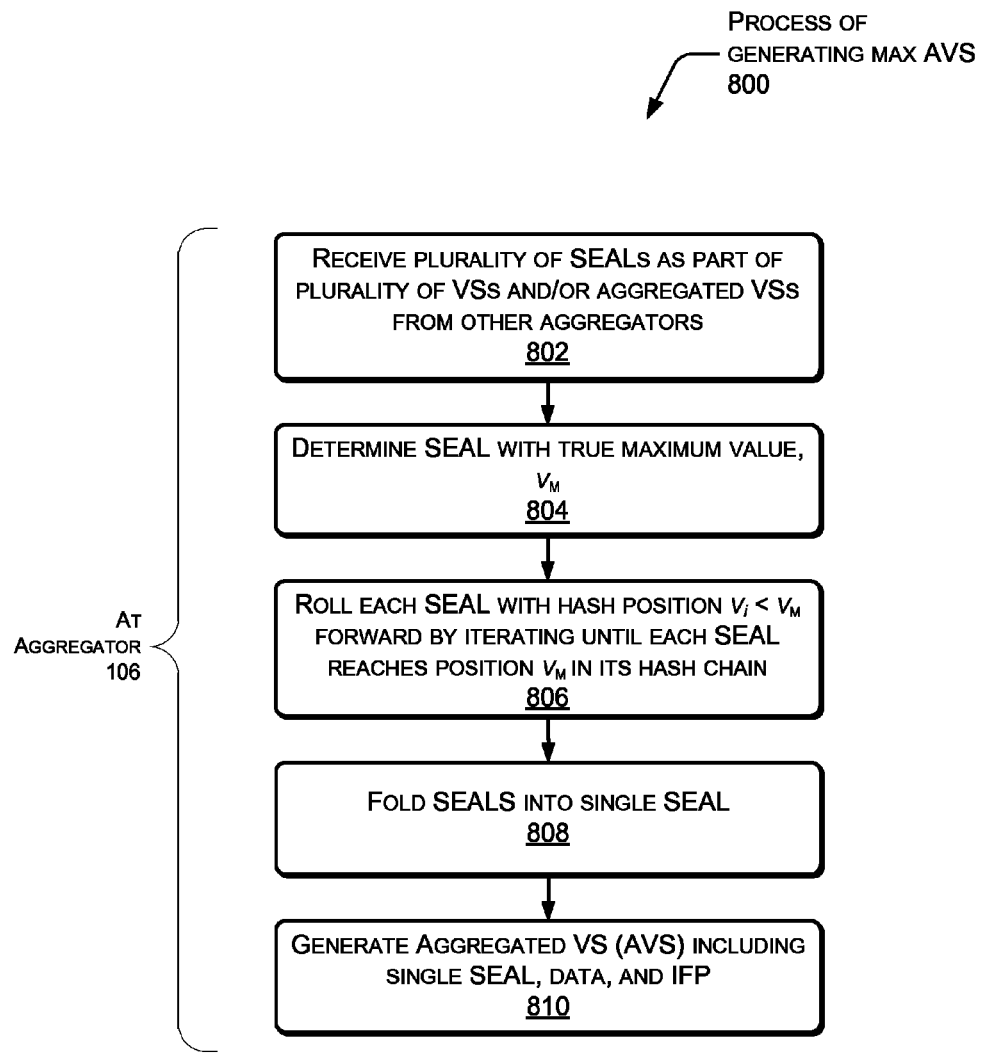
FIG. 8 is a flow diagram of an illustrative process of generating aggregated verifiable synopses ("AVS") using a maximum function.

FIG. 8 is a flow diagram of an illustrative process of generating aggregated verifiable synopses ("AVS") incorporating a max function that may, but need not, be implemented using the architectures shown in FIGS. 1-6. The process 800 will be described in the context of the architecture of FIGS. 1-6 for convenience and clarity. In some variations, the process 800 may be used to implement the secure outsourced aggregation shown and described with reference to FIG. 1. In one implementation, the following process may take place at an aggregator.

At 802, a plurality of VSs are received, the VSs comprising SEALS. These may be VSs directly from sensors, or aggregated VS provided by other aggregators. At 804, the maximum value $v_m$ is determined. At 806, each SEAL with hash position $v_i < v_m$ is rolled forward by iterating until each SEAL reaches position $v_m$ in its hash chain. At 808, the SEAL chains of equal length are folded into a single SEAL. At 810, an aggregated VS ("AVS") is generated, including a single SEAL, sensor data, and IFP.

Figure 9:
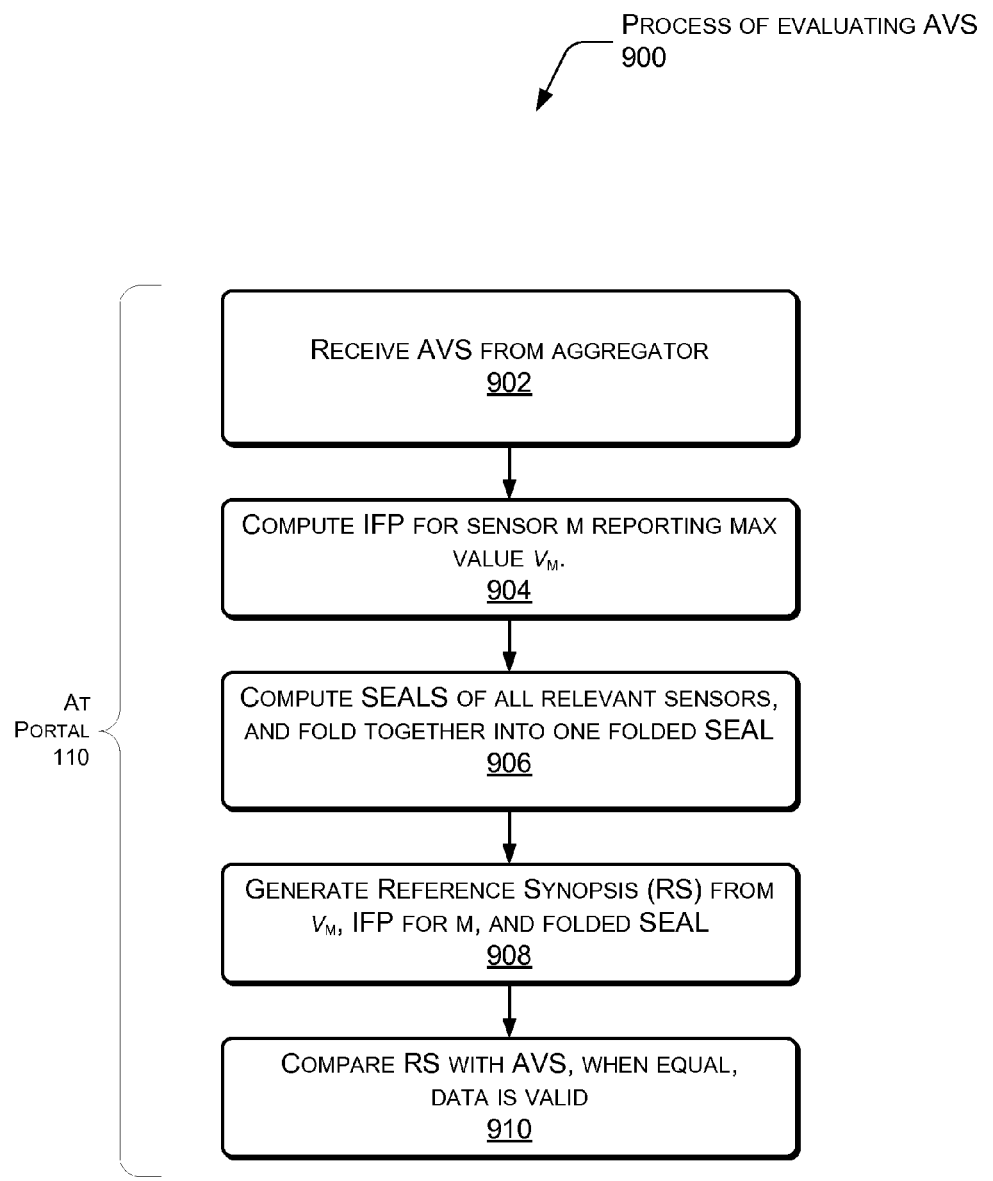
FIG. 9 is a flow diagram of an illustrative process of evaluating an AVS.

FIG. 9 is a flow diagram of an illustrative process of evaluating an AVS that may, but need not, be implemented using the architectures shown in FIGS. 1-6. The process 900 will be described in the context of the architecture of FIGS. 1-6 for convenience and clarity. In some variations, the process 900 may be used to implement the secure outsourced aggregation shown and described with reference to FIG. 1. In one implementation, the following process may take place at a portal.

At 902, an AVS is received from an aggregator at a portal. The portal may now begin to validate the data provided in the AVS. At 904, an IFP is computed for the sensor reporting the max value $v_m$ to be incorporated into a reference synopsis ("RS"), in essence repeating what has been done at a sensor. At 906, all individual SEALs from relevant sensors are computed and folded together to produce a single SEAL for the RS. This repeats what was done at the aggregator(s). At 908, a RS is generated using $v_m$, IFP for the sensor reporting the max value $v_m$, and the single folded SEAL. At 910, the RS is compared with the AVS, and when equal, the data in the AVS is determined to be valid because the results reported by the aggregator match those replicated by the portal.

This assertion of validity results from several aspects: First, the portal is aware of the reporting schedule for each sensor, and thus can use the proper epoch number as the T value when generating its version of the IFP and SEAL. Second, the portal and the sensors share a secret key, which the aggregators lack. Third, the list of offline sensors available to the portal allows the portal to check that active sensors have not been incorrectly indicated as being offline.

Rolling and Folding SEALS

Figure 10:
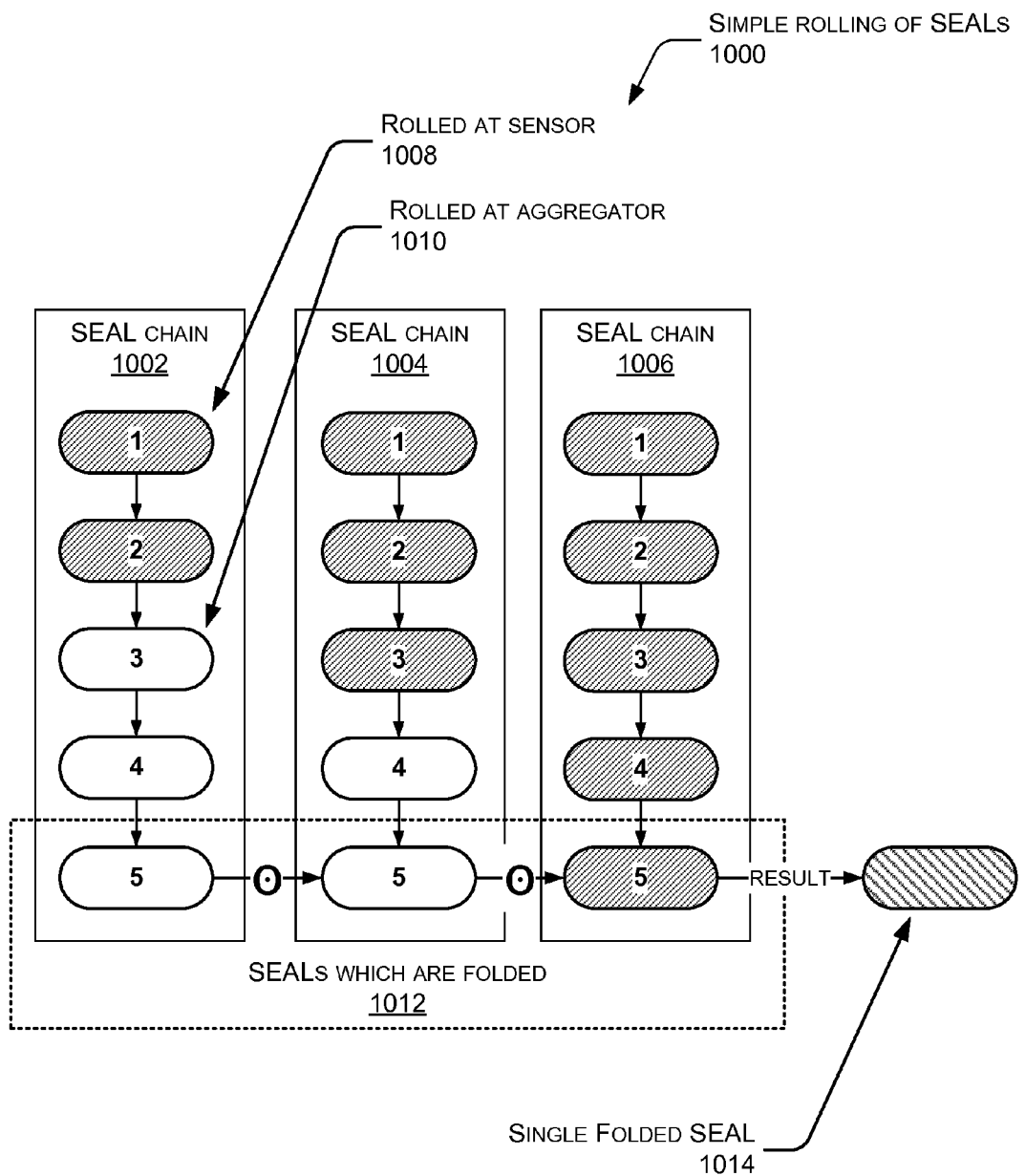
FIG. 10 is a schematic diagram illustrating simple rolling of SEALs.

FIG. 10 is a schematic diagram 1000 illustrating simple rolling of SEALs. Shown in this example are three SEAL chains, 1002, 1004, and 1006. SEALs which have been rolled forward using one-way function F( ) at the sensor are indicated with the cross-hatching indicated at 1008. The length of SEAL chains 1002, 1004, and 1006 as rolled forward at the sensor are 2, 3, and 5 respectively. SEALS which have been rolled forward at an aggregator are indicated without cross-hatching at 1010. Simple folding rolls all SEAL chains forward using F( ) until they are the same length, whereupon the SEAL chains are folded together. For example, in this diagram SEAL chain 1002 is rolled forward three times at the aggregator to bring it to length 5. Similarly, SEAL chain 1004 is rolled forward two times to bring it to length 5. Thus, a total of five forward rolling operations were executed in this example.

In this schematic, the SEALS which now all of equal length after rolling forward at the aggregator, are folded 1012 together and result in a single folded seal 1014. Simple rolling is straightforward to implement, however the requirement that all chains be brought to the same length before folding may result in significant computational overhead. However, it is possible to greatly reduce this overhead through folded rolling, described next.

Figure 11:
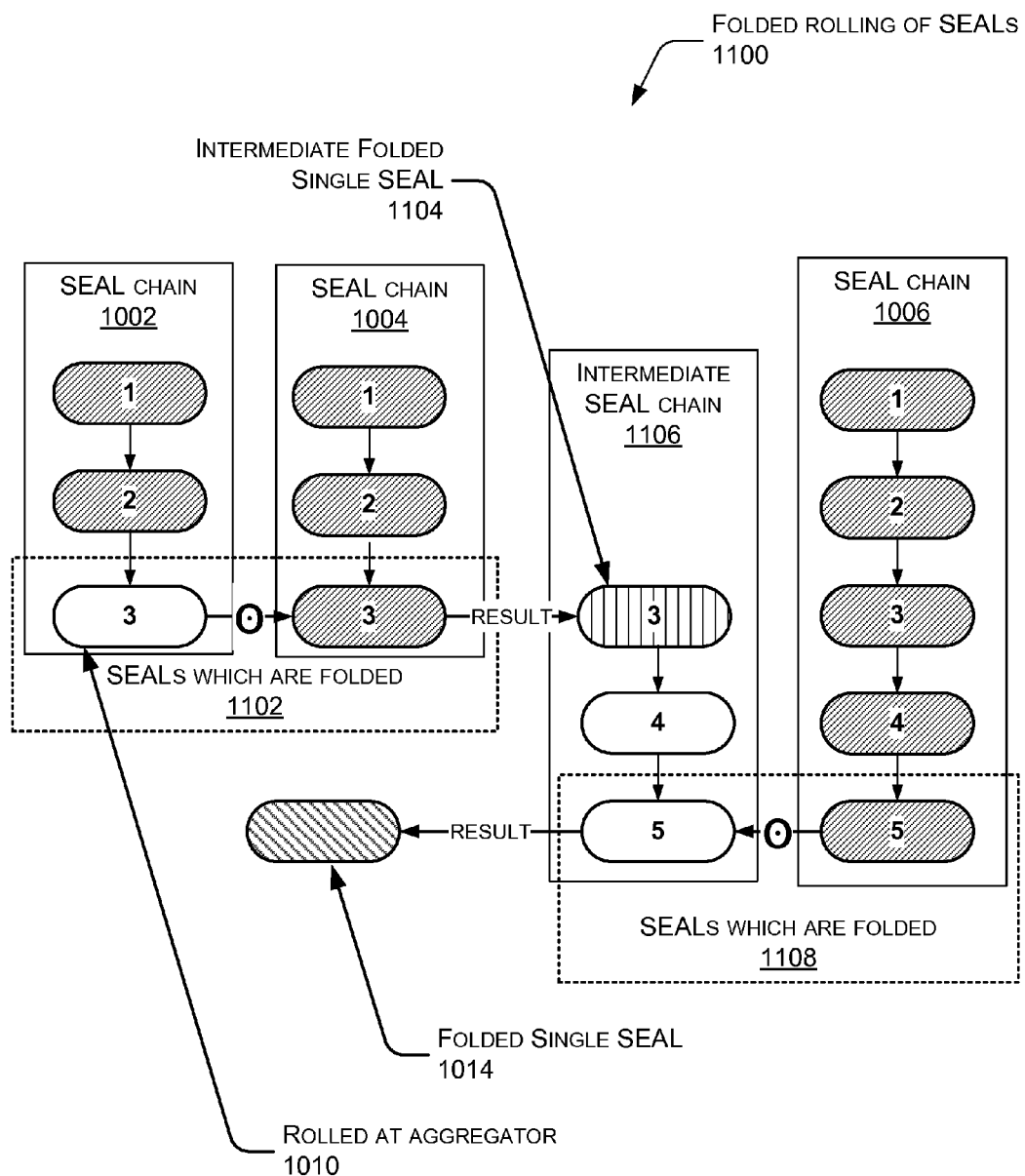
FIG. 11 is a schematic diagram illustrating folded rolling of SEALs.

FIG. 11 is a schematic diagram 1100 illustrating folded rolling of SEALs. As in FIG. 10, SEAL chains 1002, 1004, and 1006 are shown in this figure. Folded rolling utilizes the homomorphic properties of F( ) by sorting SEAL chains by length, and rolling a SEAL chain forward (if necessary) until its length equals the adjacent SEAL chain in the sorted list, whereupon the two may be folded together. This is repeated until only a single folded SEAL remains. This significantly reduces forward rolling requirements.

For example, SEAL chain 1002 of length 2 is closest in length to SEAL chain 1004 of length 3. SEAL chain 1002 is rolled forward once to equal the length of SEAL chain 1004. Once of equal length, SEAL chains 1002 and 1004 may be folded together as shown at 1102. The resulting intermediate folded single SEAL 1104 is then compared with SEAL chain 1006 of length 5. Intermediate SEAL chain 1106 comprising intermediate folded single SEAL 1104 is rolled forward twice until its length matches that of SEAL chain 1006. Once the lengths of the SEAL chains are matched, the SEALS are folded 1108, with a resulting folded single seal 1014. Due to the homomorphic properties of the one-way function, the folded single SEAL 1014 from the simple rolling of FIG. 10 and the folded rolling of FIG. 11 are equivalent.

Given that RSA is considered more computationally intensive than traditional hashing, it is not at first apparent how use of RSA reduces computational overhead. In such a case, it is useful to look at the entire processing load. A comparison of the simple rolling of FIG. 10 with folded rolling FIG. 11 demonstrates a significant reduction in the required amount of forward rolling. In FIG. 10, five executions of the function F( ) were required to roll the SEAL chains forward to enable folding. In contrast, FIG. 11 only required three executions of function F( ) on an aggregator or portal. Thus, using a one-way function such as RSA in conjunction with folded rolling results in less overhead than when conventional hashing is used.

Folded rolling is also effective in reducing overhead in a Count protocol (a secure protocol for answering Count queries, based on our secure Max protocol). Suppose the Count protocol uses the count algorithm by Alon, Matias, and Szegedy (AMS). The approximation error of the AMS algorithm can be reduced by using multiple instances of it simultaneously. Let J represent the number of instances of an AMS count algorithm, N represent the total number of sensors, and C represent the number of "child" sensors of an aggregator. Then, each AMS algorithm needs to invoke log N instances of Max algorithm. First, for each of the J instances of the Count protocol, an aggregator needs to use the F( ) function to aggregate all of the VSs received from children of the aggregator. Doing so naively would incur up to J·C·log N executions of F( ). Folded rolling reduces this number to J·log N, making it independent of C.

Second, when a portal receives the JVSs (that is, one VS for each instance) from a root aggregator, the portal needs to verify each of those VSs. To enable folded rolling, J instances may be designed to use the same RSA encryption function (i.e., with the same encryption key) to construct their one-way SEAL chains. For the jth instance, a sensor i will generate its DFP as $s^-_{i,j}=\{MAC_{Ki}(T\|j)\}$. $s^-_{i,j}$ is then used as the seed for the one-way chain for sensor I in the instance j. Let the folded SEAL in the VS submitted to the portal for the jth instance be $x_j$, such that $x_j$ should be $\odot_i F^{V_m}(s^-_{i,j})$ where $v_m$ is the maximum for this instance and when the aggregators are honest in their reporting. For the jth instance, with folded rolling, the portal may create the RS by first folding all $s^-_{i,j}$'s (for the given j) together, and then rolling forward to $v_m$. Doing so reduces the total number of executions of F( ) from J·N·log N to J·log N executions.

Folded rolling may also be applied across the J instances described above. Let w be the maximum across all the J maximums reported int eh J instances, which is roughly log N. Instead of verifying $x_j$'s individually, the portal may roll (actually or conceptually) the $x_j$'s to position w, then fold together. By applying folded rolling, the total number of executions of F( ) is ≤log N. With respect to the RS, the portal may (actually or conceptually) roll all of the $s^-_{i,j}$'s forward to w and fold them. Again, folded rolling enables this to be done with no more than log N executions of F( ). This aggressive optimization helps reduce the number of F( ) executions on a portal to 2 log N per verification, which is completely independent of J.

Finally, a parent aggregator may actually fold all of the $x_j$'s at identical positions (on the one-way chains) together before sending the data along to the portal. Since there may be at most log N distinct positions for all $x_j$'s, the total number of SEALs sent from the parent aggregator to the portal will be no more than log N. For example, where N=100,000 and 1024-bit SEALs, this will be less than 2 kilobytes. For the J IFP $s^+_{i,j}$, the parent aggregator may also fold them together before sending to the portal.

Folded rolling only helps to reduce the number of rolling operations. For each query, the portal still needs to generate an RS which takes up to J·N folding operations (modulo multiplication) to fold all the $s^-_{i,j}$'s together. Queries may have range predicates that cover sensors with continuous id ranges. For these queries, the portal can create a binary tree (or a B+-tree or an R-Tree) at the beginning of each time epoch. The leaves of the tree are all the $s^-_{i,j}$'s, ordered by i from left to right. Each internal node of the tree is the modulo multiplication of its children. Constructing such a tree still takes J·N folding operations, but this only needs to be done once per epoch.

Regardless of the id range required by the query, it is possible to always find no more than 2 log N disjoint subtrees, such that the set of all the leaves of these subtrees is exactly the set of sensors falling within that range. Roots of these subtrees can be found with a pre-order traversal of the tree. Multiplying all the root of these subtrees then yields the folding result needed. Doing so thus reduces the number of multiplications from J·N to 2 log N. It is trivial to generalize such technique to dealing with range predicates based on other static attributes of the sensors. One can simply build one tree for each static attribute.

Figure 12:
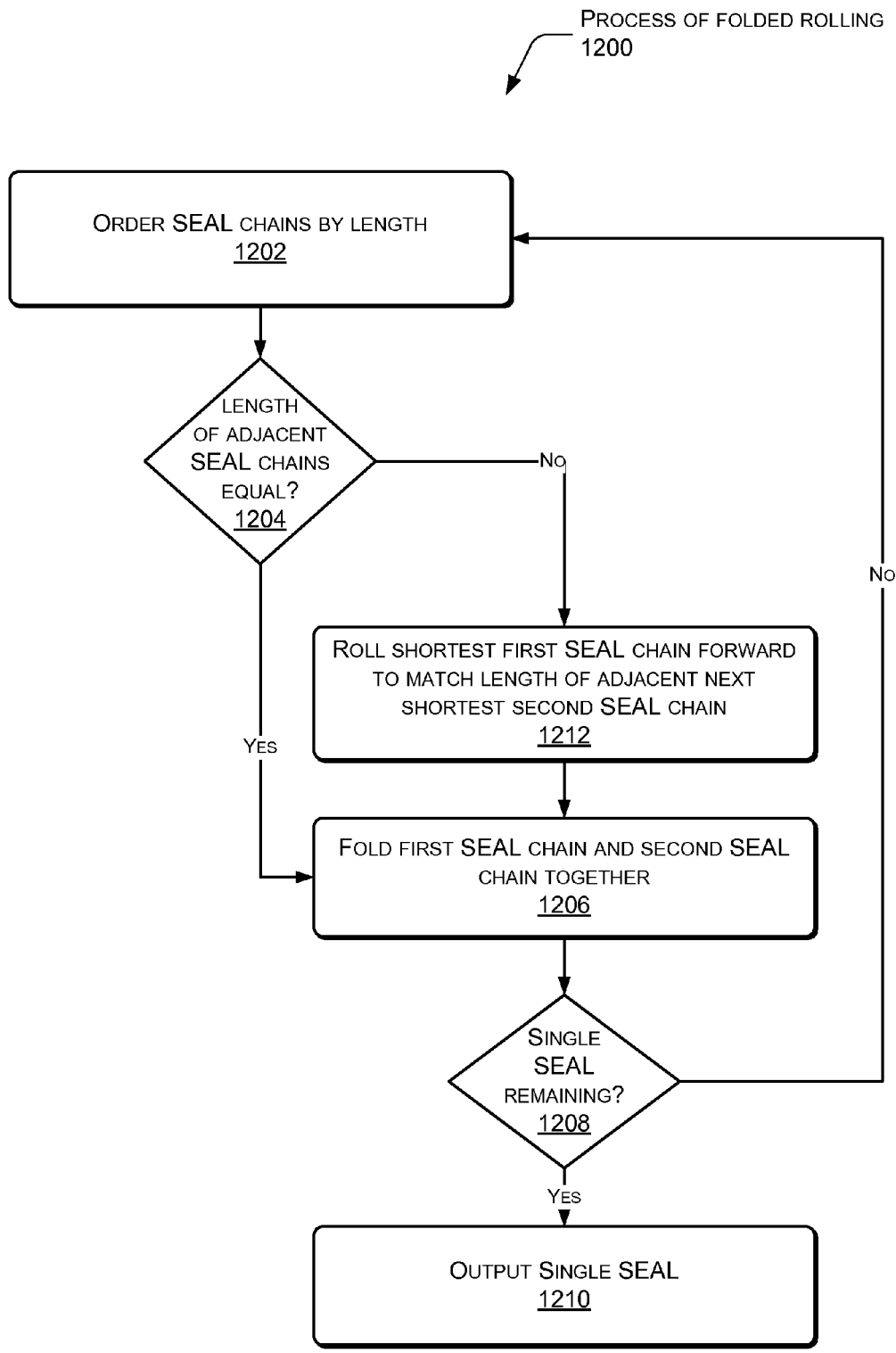
FIG. 12 is a flow diagram of an illustrative process of folded rolling.

FIG. 12 is a flow diagram of an illustrative process 1200 of folded rolling that may, but need not, be implemented using the architectures shown in FIGS. 1-6. The process 1200 will be described in the context of the architecture of FIGS. 1-6 for convenience and clarity. In some variations, the process 1200 may be used to implement the secure outsourced aggregation shown and described with reference to FIG. 1. In one implementation, the following process may take place at an aggregator, parent aggregator, or portal.

At 1202, SEAL chains are ordered by length. At 1204, a determination is made as to whether the first two adjacent SEAL chains are of equal length. When 1204 determines the first two adjacent SEAL chains to be of equal length, at 1206 the first SEAL chain and second SEAL chain are folded together. At 1208, a determination is made as to whether there is only a single SEAL remaining. When only a single SEAL remains as determined at 1208, at 1210 a single SEAL is output.

Returning to 1204, when adjacent SEAL chains are not of equal length, at 1212 the shortest first SEAL chain is rolled forward to match the length of the adjacent next shortest SEAL chain. At 1206, the first SEAL chain and second SEAL chain, now of equal length, are folded together. This process continues until, as described above, at 1208 it is determined that only a single SEAL remains.

Determining Top "k" Values

Figure 13:
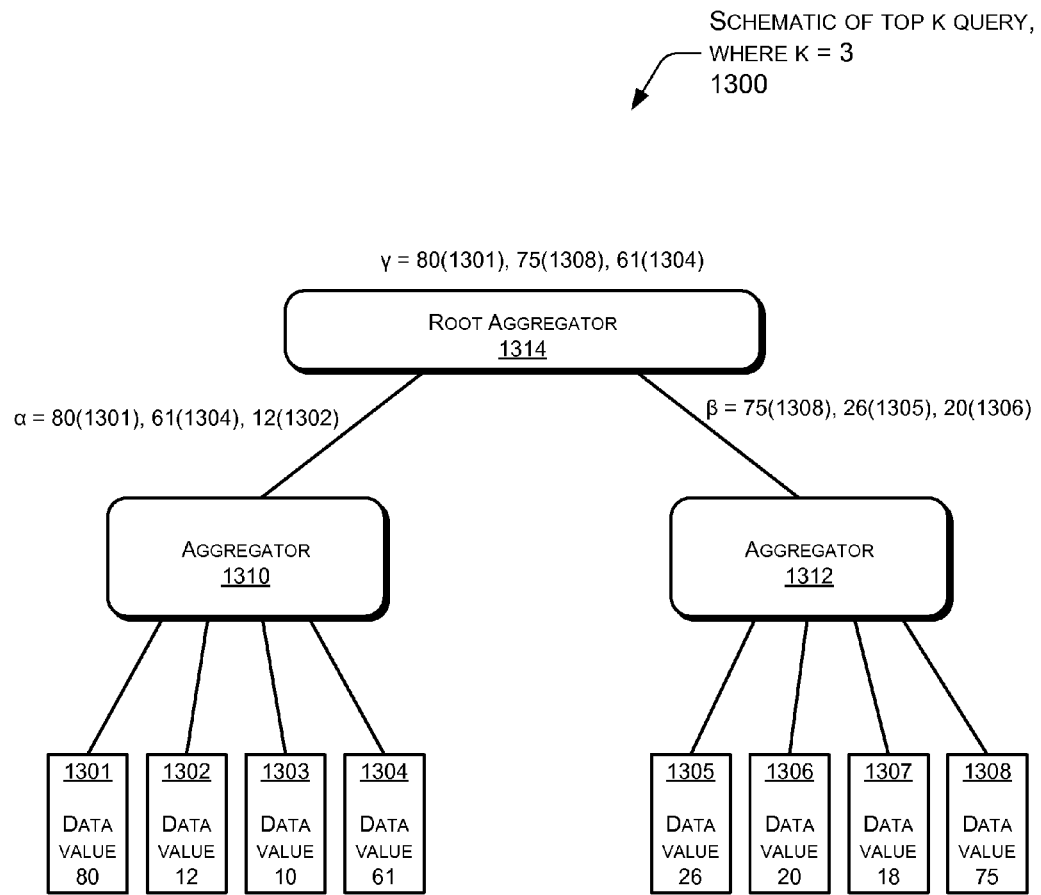
FIG. 13 is a schematic diagram illustrating a top-k query.

FIG. 13 is a schematic diagram 1300 illustrating a top-k query, where k=3. Illustrated are sensors 1301-1304 which report to aggregator 1310, and sensors 1305-1308 which report to aggregator 1312. Aggregators 1310 and 1312 in turn report to parent aggregator 1314. For this illustration, the sensors report the following values:

TABLE 2

| Sensor # | Data value | Reports to Aggregator |
|---|---|---|
| 1301 | 80 | 1310 |
| 1302 | 12 | 1310 |
| 1303 | 10 | 1310 |
| 1304 | 61 | 1310 |
| 1305 | 26 | 1312 |
| 1306 | 20 | 1312 |
| 1307 | 18 | 1312 |
| 1308 | 75 | 1312 |

Without loss of generality, it may be assumed that sensor values are all distinct (e.g., by appending the id of a sensor to its reading). In one implementation, a Top k query may be satisfied by invoking the Max protocol sequentially for k times. Namely, the first invocation will return the largest value together with which sensor $i_1$ generated this Max. The second invocation of the protocol will simply exclude sensor $i_1$, and then compute the Max again. To exclude sensor $i_1$, the parent aggregator (after the first invocation and after knowing $i_1$) needs to potentially broadcast $i_1$ to all the aggregators, so that they can exclude sensor $i_1$ in the protocol. The second invocation will then produce the second largest value as well as which sensor $i_2$ generated this second largest value. More precisely, for the second largest value, the VS submitted to the portal will be $(v_{i2}, s^+_{i2}, \odot_{i \neq i1} F^{vi2}(s_i^-))$. Invoking the Max protocol in this way sequentially for k times can then answer the Top k query.

However, invoking Max sequentially for k times may incur unnecessary delay. This is particularly true when using a top-k query to obtain k random samples, where k may be as large as several hundreds. It is possible to mimic the above process via k parallel invocations of the Max protocol. This parallel invocation requires addressing several complexities: For example, for the ith largest value, it may be necessary to produce folded $s_i^-$'s of all sensors excluding those generating the top i-1 values. The challenge is that each aggregator, when performing the aggregation, does not yet know which sensors generated the globally top i-1 values.

Consider the example in FIG. 13 where k=3. VS α contains the top three values known by aggregator 1310. Similarly, VS β contains the top three values known by aggregator 1310. For discussion purposes, the sensor number is enclosed in parenthesis, thus 80(1301) denotes sensor 1301 reporting value 80.

It is easy to include similar verification information in α as before in the Max protocol. For example, to prove that 61 is the maximum reading seen so far excluding the reading from sensor 1301, α may include $F^{61}(s_2^-) \odot F^{61}(s_3^-) \odot F^{61}(s_4^-)$. β covers sensors 1305 through 1308 and the Top-3 values observed so far are 75(1308), 26(1305), and 20(1306). It is thus possible to take the Top-k values of a union when merging two synopses. Thus the new Top-3 values after aggregation should be 80(1301), 75(1308), and 61(1304).

In the new VS, the verification information for 61 needs to be the folded $s_i^-$'s of sensors 1302 through 1307, since 61 is the third largest value and it becomes worthwhile to exclude sensors 1301 and 1308 which generated the top two values. Notice that for the value 61, α only contains the folded $s_i^-$'s of sensors 1302, 1303, and 1304 (i.e., $F^{61}(s_2^-) \odot F^{61}(s_3^-) \odot F^{61}(s_4^-)$). At this point $F^{61}(s_5^-)$, $F^{61}(s_6^-)$, or $F^{61}(s_7^-)$ are not known. Fortunately, the verification information for 26(1305) in β should contain the folded signatures from sensors 1305, 1306, and 1307 (i.e., $F^{26}(s_5^-) \odot F^{26}(s_6^-) \odot F^{26}(s_7^-)$). Since 61>26, it is possible to roll this folded signature forward and then fold it with the one from α.

The above includes several subtleties: For example, if β only contained $F^{20}(s_6^-) \odot F^{20}(s_7^-)$ and $F^{75}(s_5^-) \odot F^{75}(s_6^-) \odot F^{75}(s_7^-) \odot F^{75}(s_8^-)$, it may not be possible to generate the verification information for 61. However, as demonstrated later, it is always possible to generate the verification information for 61 by finding the largest value in β that is smaller than 61, and use its corresponding verification information. This means that the previous problematic scenario will never occur.

A protocol for a top-k query may be implemented in the following fashion. For any given aggregator in the aggregation tree, its coverset is defined as the set of all sensors in its subtree. For Top-k query, the VS sent by an aggregator with coverset U has the form of: $\{VS_{i1}, VS_{i2}, \ldots, VS_{ik'}\}$ where $VS_{ij} = (v_{ij}, s_{ij}^-, \odot_{i \in S\{i_1, i_2, \ldots, i_{j-1}\}} F^{vij}(s_i^-))$, and $$v_{i1} > v_{i2} > \ldots > v_{ik'}.$$

The value of k' is within [1, k]. Roughly speaking, $VS_{i1}$ through $VS_{ik'}$ contains the top-k' values observed so far, and these values are from sensors $i_1$ through $i_{k'}$. The value k' may be smaller than k initially (i.e., when observing less than k values).

A sensor i with reading $v_i$ generates: $\{(v_i, s_i^+, F^{vi}(s_i^-)\}$. Let $\alpha = \{\alpha_{i1}, \alpha_{i2}, \ldots\}$ and $\beta = \{\beta_{i1}, \beta_{i2}, \ldots\}$. An aggregator may aggregate α and β into $\gamma = \{\gamma_{i1}, \gamma_{i2}, \ldots\}$. Here, $\gamma_{i1}, \gamma_{i2}, \ldots$ correspond to the Top-k values among $\alpha_{i1}, \alpha_{i2}, \ldots,$ and $\beta_{i1}, \beta_{i2}, \ldots$. Without loss of generality, consider some $\alpha_x = (v_x, s_x^+, f_x)$ in α that is one of the new Top-k values, where it becomes worthwhile to construct a corresponding $\gamma_x$ in γ. Let $v_y$ be the largest value in β (i.e., among $v_{j1}, v_{j2}, \ldots$) such that $v_x > v_y$.

If $v_y$ does exist, let the element $\beta y = (v_y, s_y^+, f_y)$. $\gamma_x$ may be constructed as follows:

$$\gamma_x = (v_x, s_x^+, f_x \odot F^{(v_x - v_y)}(f_y))$$

To understand why doing so is correct, suppose α covers $U_α$ and β covers $U_β$. Then $f_x$ covers all sensors in Uα except those sensors with readings larger than $v_x$. Similarly, $f_y$ covers all sensors in Uβ except those sensors with readings larger than $v_y$. But because $v_x > v_y$ and $U_β$ does not contain any sensor with a reading between $v_x$ and $v_y$, $f_y$ actually covers all sensors in $_{U}β$ except those sensors with readings larger than $v_x$. As a result, $f_x = \ominus F^{(v_x - v_y)}(f_y)$ exactly covers all sensors in $U_α \cup U_β$ except those sensors with readings larger than $v_x$.

If all values in β are larger than $v_x$, then $v_y$ does not exist and $\gamma_x$ may be set to $\gamma_x = \alpha_x$. In such a case, β must have less than k values, since otherwise $v_x$ can never be among the new Top-k. Let $U_β$ be the set of sensors covered by β. Then all sensors in $U_β$ have readings larger than $v_x$. As a result, it is not necessary to fold additional $s_i^-$'s from any sensor in $U_β$.

With the above in mind, synopsis evaluation becomes trivial. Namely, the portal may verify the largest value as before for Max, then verifies the second largest value as the Max excluding the largest value, and so on.

To reduce the overhead of verification when k is large, the portal may verify the $VS_{i_k}, \ldots VS_{i_2}, VS_{i_1}$ according to that order. After constructing the RS of $\rho_k = \ominus_{i \in \{i_1, i_2, \ldots, i_{k-1}\}} F^{v_{i_k}}(s_i^-)$ for $VS_{i_k}$, the portal may generate the RS for $VS_{i_k}$ as $\rho_{k-1} = F^{v_{i_{k-1}} - v_{i_k}}(\rho_k \ominus (s_{i_{k-1}}^-))$. Doing so will make the number of F( ) operations independent of k.

It is also worthwhile to note that a Uniform Samples query may be be readily reduced to a Top-k query, by having each sensor generate a uniformly random number in (0, 1) and by returning the sensors with the Top k numbers. $k^{th}$ statistical moments, quantiles, and median may all be computed from uniform samples, and thus may be securely computed using this protocol for top-k query.

Figure 14:
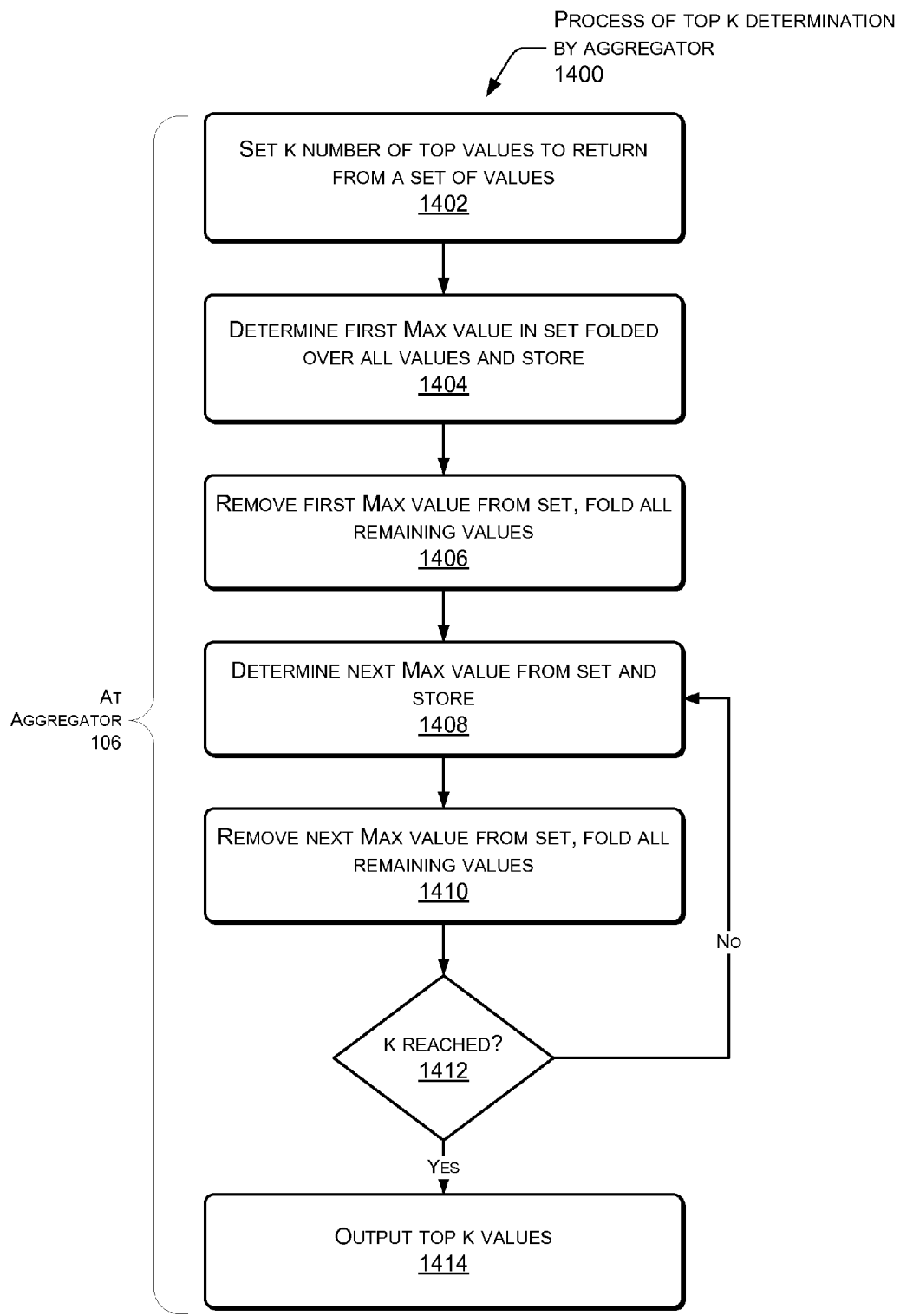
FIG. 14 is a flow diagram of an illustrative process of determining top-k values.

FIG. 14 is a flow diagram of an illustrative process 1400 of determining top-k values at an aggregator, where k is predetermined. At 1402, a k number of top values to return from a set of values is configured. This may be from user input, parameter determined by software, and so forth. At 1404, a first max value in the set folded over all values is determined and stored. At 1406, the first max value is removed from the set, and the remaining values are folded. At 1408, a next max value is determined from the set, and stored. At 1410, the next max value is removed from the set, and the remaining values are folded. At 1412, if k has been reached those top-k values, at 1414 the top-k values are output. Otherwise, at 1412 k has not been reached, the process returns to 1408 and continues until the top-k values have been reached.

CONCLUSION

Although specific details of illustrative methods are described with regard to the figures and other flow diagrams presented herein, it should be understood that certain acts shown in the figures need not be performed in the order described, and may be modified, and/or may be omitted entirely, depending on the circumstances. As described in this application, modules and engines may be implemented using software, hardware, firmware, or a combination of these. Moreover, the acts and methods described may be implemented by a computer, processor or other computing device based on instructions stored on memory, the memory comprising one or more computer-readable storage media (CRSM).

The CRSM may be any available physical media accessible by a computing device to implement the instructions stored thereon. CRSM may include, but is not limited to, random access memory (RAM), read-only memory (ROM), electrically erasable programmable read-only memory (EEPROM), flash memory or other solid-state memory technology, compact disk read-only memory (CD-ROM), digital versatile disks (DVD) or other optical disk storage, magnetic cassettes, magnetic tape, magnetic disk storage or other magnetic storage devices, or any other medium which can be used to store the desired information and which can be accessed by a computing device.

What is claimed is:

1. A computer-implemented method of securely outsourcing data aggregation, the method comprising:
   using a processor of a verifying computer, receiving an aggregated verifiable synopsis (AVS) corresponding to an aggregated result of a set of data values provided by a plurality of sources;
   using the processor of the verifying computer, verifying the aggregated result of the set of data values provided by the plurality of sources by using the received aggregated verifiable synopses (AVS), the AVS comprising at least one received data value of the set of data values provided by the plurality of sources, a received folded self-authentication value (SEAL) for the aggregated result of the set of data values, and a received inflation free proof (IFP) of a received maximum data value $v_m$ of the set of data values provided by the plurality of sources, the at least one received data value of the set of data values provided by the plurality of sources including at least the received maximum data value, the verifying comprising:
      computing a reference inflation free proof (IFP) for the received maximum data value using a cryptographic function known to the verifying computer and a source of the plurality of sources providing the received maximum data value using at least a value indicative of the received maximum data value;
      computing individual reference self-authentication values (SEALs) for the plurality of sources providing the data using a one-way function, and
      folding the individual reference SEALs together to form a reference folded SEAL;
      comparing the received IFP of the received aggregated verifiable synopsis to the computed reference IFP and the received folded SEAL of the received aggregated verifiable synopsis to the reference folded SEAL; and
      designating the received aggregated verifiable synopsis as valid based at least in part on the comparing determining that the received IFP equals the computed reference IFP and the received folded SEAL equals the reference folded SEAL.

2. The method of claim 1, wherein the set of data values provided by the plurality of sources changes over time.

3. The method of claim 1, wherein the folding comprises modulo multiplication.

4. The method of claim 1, wherein the received folded SEAL comprises a chain of iterations of the one-way function of a maximum length, the one-way function is a homomorphic one-way function, the reference folded SEAL computed by rolling individual reference SEALs forward by iterating with the homomorphic one-way function F until the individual reference SEALs are of length equal to the maximum length and folding the individual reference SEALS together to form the reference folded SEAL.

5. The method of claim 1, wherein the one-way function is a homomorphic one-way function F.

6. The method of claim 1, further comprising determining a top-k listing of the data values of the set of data values provided by the plurality of sources, where k is pre-defined.

7. The method of claim 1, further comprising associating each data value in the set of data values with an IFP representing that data value.

8. The method of claim 1, wherein the cryptographic function used to generate the reference IFP comprises a full domain hash with parameters including a key, a time epoch, and a data value v.

9. A method of securely aggregating data, the method comprising:
using one of more processors of one or more computing devices, for a plurality of self-authenticating values (SEAL) that have been iterated with a function F( ) at least one iteration and that corresponding to a plurality of data values, determining a particular self-authenticating value (SEAL) of the plurality of SEALs that has been iterated with the function F( ) a maximum number of iterations (m) among the plurality of SEALs corresponding to the plurality of data values;
for each of the plurality of SEALs that has been iterated with F( ) a number of iterations less than m, rolling each SEAL that has been iterated a number of iterations less than m forward by iterating the SEAL with F( ) until each of the plurality of SEALs has been iterated m number of iterations with F( ), F( ) being a one-way function applied to a seed or folded set of seeds of the corresponding SEAL; and
folding the plurality of SEALs that have been iterated m number of iterations together to form a single SEAL.

10. The method of claim 9, wherein $F^v( )$ comprises a homomorphic one-way function.

11. The method of claim 9, wherein each SEAL of the plurality of SEALs is a corresponding seed iterated by $F^v( )$ at least once.

12. The method of claim 11, wherein each seed comprises a full domain hash with parameters including a shared key and a time epoch.

13. One or more computer-readable storage devices storing instructions that when executed instruct a processor to perform acts comprising:
ordering at least a subset of a plurality of self-authenticating values (SEAL) chains by length, the length of a SEAL chain being the number of iterations of the function $F^v( )$ applied to the SEAL chain and wherein the ordering at least the subset of the plurality of SEAL chains by length comprises sorting the at least the subset of the plurality of SEAL chains based on the number of iterations that the function $F^v( )$ has been applied to each of the at least the subset of the plurality of SEAL chains, $F^v( )$ being a one-way function applied to a seed or folded set of seeds of the corresponding SEAL chain;
subsequent to the ordering, where adjacent SEAL chains of the subset are not of equal length, rolling a shorter SEAL chain of the adjacent SEAL chains forward to match length of the longer adjacent SEAL chain, wherein rolling the shorter SEAL chain forward to match the length of the longer adjacent SEAL chain comprises applying the function $F^v( )$ to the shorter SEAL chain of the adjacent SEAL chains until the number of iterations of the function $F^v( )$ applied to the shorter SEAL chain of the adjacent SEAL chains is equal to the number of iterations of the function $F^v( )$ applied to the longer SEAL chain of the adjacent SEAL chains; and
folding a plurality of pairs of SEAL chains of equal length together to form a single SEAL.

14. The one or more computer-readable storage devices of claim 13, the acts further comprising folding SEAL chains until a single SEAL remains.

15. The one or more computer-readable storage devices of claim 13, wherein each SEAL chain is a corresponding seed iterated by $F^v( )$ at least once and the seed comprises a full domain hash with parameters including a shared key and a time epoch.

16. The one or more computer readable storage devices of claim 13, wherein the function $F^v( )$ is a one-way function.

17. The one or more computer-readable storage devices of claim 16, wherein the one-way function is homomorphic.

18. The one or more computer-readable storage devices of claim 16, wherein the one-way function comprises RSA encryption.

* * * * *